(12) United States Patent
Amenyo

(10) Patent No.: US 12,500,481 B2
(45) Date of Patent: *Dec. 16, 2025

(54) ENERGY STORAGE SYSTEM USING BALLISTIC BALLS

(71) Applicant: Research Foundation of the City University of New York, New York, NY (US)

(72) Inventor: John-Thones Amenyo, Jamaica, NY (US)

(73) Assignee: Research Foundation of the City University of New York, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/785,517

(22) Filed: Jul. 26, 2024

(65) Prior Publication Data

US 2024/0388167 A1    Nov. 21, 2024

Related U.S. Application Data

(63) Continuation-in-part of application No. 17/839,290, filed on Jun. 13, 2022, now Pat. No. 12,081,105.

(60) Provisional application No. 63/209,526, filed on Jun. 11, 2021.

(51) Int. Cl.
   *H02K 7/18*    (2006.01)

(52) U.S. Cl.
   CPC .................. *H02K 7/1823* (2013.01)

(58) Field of Classification Search
   CPC ................................. H02K 7/1823
   See application file for complete search history.

(56) References Cited

U.S. PATENT DOCUMENTS

| | | | |
|---|---|---|---|
| 4,948,477 A * | 8/1990 | Gibson | C25B 1/02 205/629 |
| 11,637,479 B2 | 4/2023 | Bonutti et al. | |
| 2012/0019008 A1 * | 1/2012 | Hughley | H02K 7/1823 290/1 R |
| 2017/0101976 A1 | 4/2017 | Park | |
| 2022/0399782 A1 | 12/2022 | Amenyo | |

* cited by examiner

*Primary Examiner* — Joseph Ortega
(74) *Attorney, Agent, or Firm* — Peter J. Mikesell; Schmeiser, Olsen & Watts, LLP

(57) ABSTRACT

An energy facility that generates energy using ballistic optimized hydro-electricity. The facility sends a plurality of specialized balls from a lower storage reservoir to an upper storage reservoir. The balls fall through a drop-down system and into a power generation system with a generator and a turbine. Ballistic impacts of the balls on the turbine generate electricity before the balls are returned to the lower storage reservoir.

19 Claims, 28 Drawing Sheets

ENERGY STORAGE SYSTEM USING BALLISTIC BALLS

CROSS-REFERENCE TO RELATED APPLICATIONS

This application claims priority to, and is a continuation-in-part of, U.S. patent application Ser. No. 17/839,290 (filed Jun. 13, 2022) which is a non-provisional of U.S. Patent Application 63/209,526 (filed Jun. 11, 2021), the entirety of which are incorporated herein by reference.

BACKGROUND OF THE INVENTION

There is ongoing intense and concerted worldwide effort to achieve electrification of the global economy at all scales. This economic transition is considered urgent to achieve zero-emissions of carbon dioxide and other greenhouse gases.

Electric power production from renewable resources, such as solar and wind resources, are the most likely and most significant routes to achieving the ambitious goals of decarbonization and comprehensive electrification, within the 2030-2080 time frame. Nonetheless, these renewable resources have limitations concerning intermittency of availability, as well as variability and stochasticity of supply and demand in various marketplaces for energy and practical power.

Energy storage systems can be used to deal with the issues and challenges of the intermittency and variability. The major energy storage systems that are likely to be deployed and used in the indicated time frame will include, pumped-storage hydro-electricity; Li-ion batteries; and thermal energy storage systems. These will be supplemented by other electro-chemical batteries, such as flow batteries; fuel cells; hydrogen storage; flywheels and compressed air energy storage.

Each of the listed type of energy storage system have serious challenges that impact commercialization, deployment and use. In particular, although pumped-storage hydro-electricity has desirable attributes of long-duration storage, and very large scale capacity (for grid-scale and utility-scale deployment), it also has limitations concerning suitable siting and localization. It also has other issues relating to capital costs (capex) and thus affordability, scalability (especially, for micro-scale and meso-scale deployments). Similarly, Li-ion batteries, (and other electro-chemical batteries), have very short storage durations, and very small capacity. Hence, large-scale and long-duration deployments remain challenging. The other energy storage systems mentioned above either do not have viable commercial deployment, or still have significant issues in large-scale utilization. An improved energy storage system that addresses the concerns and challenges is therefore desirable.

The discussion above is merely provided for general background information and is not intended to be used as an aid in determining the scope of the claimed subject matter.

SUMMARY

An energy facility that generates energy using ballistic optimized hydro-electricity is provided. The facility sends a plurality of specialized balls from a lower storage reservoir to an upper storage reservoir. The balls fall through a drop-down system and into a power generation system with a generator and a turbine. Ballistic impacts of the balls on the turbine generate electricity before the balls are returned to the lower storage reservoir.

In a first embodiment, an energy facility is provided. The energy facility comprising: a plurality of balls, each ball comprising (1) an outer layer with (2) at least two inner layers that are sequentially disposed and separated from one another by a divider (3) an endosome layer within the at least two inner layers, (4) a payload container disposed within the at least two inner layers and (5) a payload disposed within the payload container, wherein the payload is selected from a group consisting of a solid and a liquid; a plurality of conduits fluidly connecting (1) a lower storage reservoir to a first uplift system (2) the first uplift system to an upper storage reservoir (3) the upper storage reservoir to a drop-down system (4) the drop-down system to a power generation system and (5) the power generation system to the lower storage reservoir, thereby defining a first loop, wherein the plurality of balls fluidly travel through the first loop; wherein: the lower storage reservoir is disposed at a first elevation; the upper storage reservoir is disposed at a second elevation that is greater than the first elevation; the first uplift system is configured to uplift the plurality of balls from the lower storage reservoir to the upper storage reservoir; the power generation system comprising a generator and a turbine that rotates upon impact by the plurality of balls to generate electricity, the power generation system being proximate the first elevation.

In a second embodiment, a system for generating electricity is provided. The system comprising: a platform proximate a surface of a body of water; a plurality of balls, each ball comprising (1) an outer layer with (2) at least two inner layers that are sequentially disposed and separated from one another by a divider (3) an endosome layer within the at least two inner layers, (4) a payload container disposed within the at least two inner layers and (5) a payload disposed within the payload container, wherein the payload is selected from a group consisting of a solid and a liquid; a plurality of conduits fluidly connecting (1) a lower storage reservoir to a first uplift system (2) the first uplift system to an upper storage reservoir (3) the upper storage reservoir to a drop-down system (4) the drop-down system to a power generation system and (5) the power generation system to the lower storage reservoir, thereby defining a first loop, wherein the plurality of balls fluidly travel through the first loop; wherein: the lower storage reservoir is disposed at a first elevation; the upper storage reservoir is disposed on the platform and at a second elevation that is greater than the first elevation; the first uplift system is configured to uplift the plurality of balls from the lower storage reservoir to the upper storage reservoir; the power generation system comprising a generator and a turbine that rotates upon impact by the plurality of balls to generate electricity, the power generation system being proximate the first elevation the lower storage reservoir, the first uplift system and the power generation system are also disposed under the surface of the body of water.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
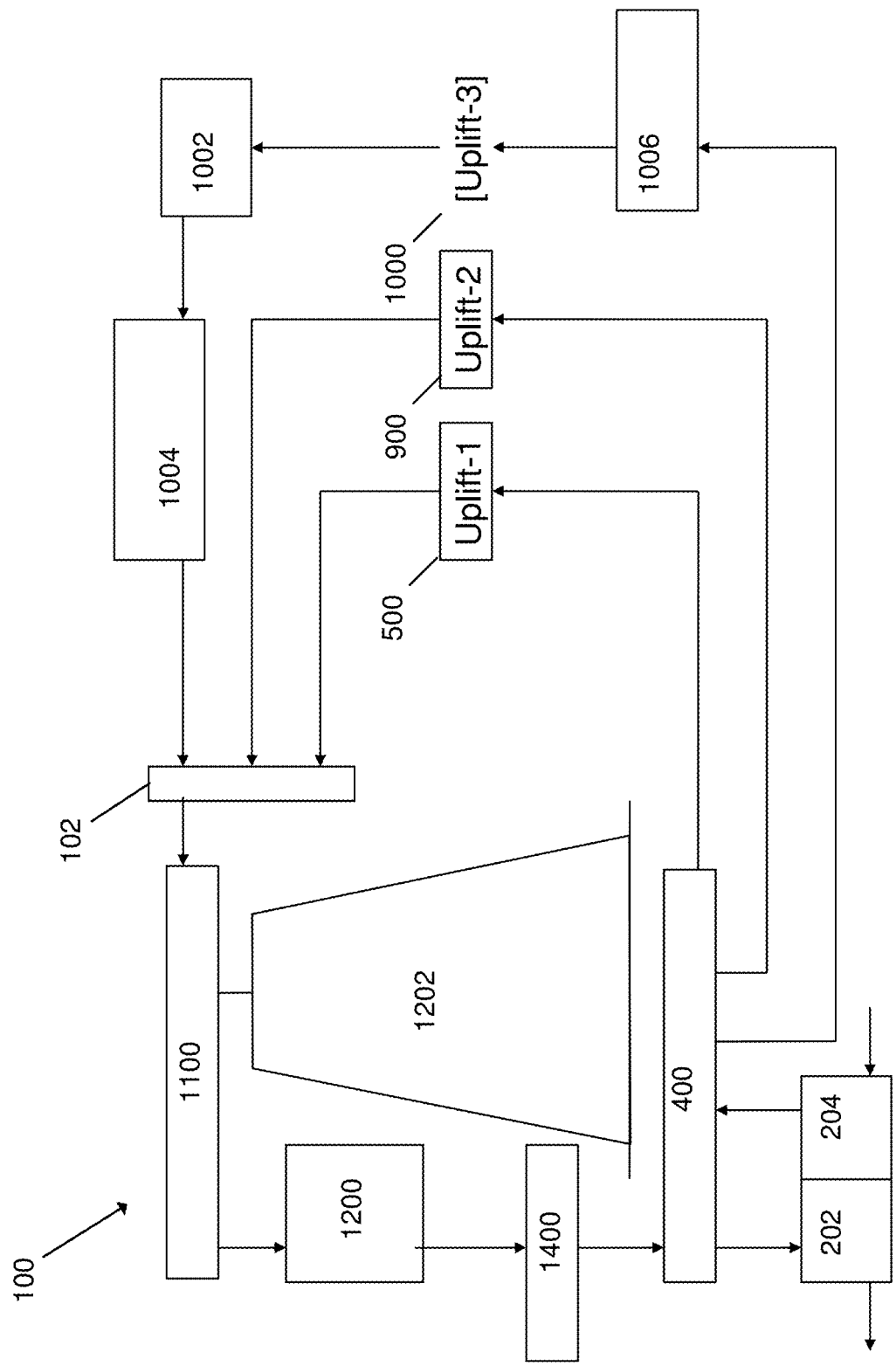
FIG. 1 is a schematic diagram of one hybrid energy facility.

Referring to FIG. 1, this disclosure provides a hybrid energy facility 100. The facility 100 uses a plurality of specialized balls 300 (not shown in FIG. 1 but see FIG. 3) that are loaded in a lower storage reservoir 400. A first uplift system 500 uplifts the balls 300 to an upper storage reservoir 1100. The uplift of the balls 300, and potentially of other masses, can-in some embodiments-be supplemented by a second uplift system 900 and/or a third uplift system 1000, that are discussed in detail elsewhere in this specification. The balls 300 drop from the upper storage reservoir 1100 through a drop-drown system 1200 and enter a power generation system 1400 that includes a turbine and a generator. The balls 300 function as a working fluid to drive the turbine and generate electricity. The balls are then returned to the lower storage reservoir 400.

FIG. 1 also depicts a ball withdrawal facility 202 and a ball input facility 204.

The principle of operation is briefly summarized as follows: upper storage reservoir 1100 is located at a higher elevation than the power generation system 1400. The upper storage reservoir 1100 and its storage contents are supported above the ground by a support 1202. The lower storage reservoir 400 is at the same (or slightly lower) elevation as the power generation system 1400.

The balls 300 are packaged in the ball input facility 204 and then stored in the lower storage reservoir 400. Balls 300 are uplifted to the upper storage reservoir 1100 by the first uplift system 500. When the balls 300 are in the upper storage reservoir 1100, they have gained potential energy. The amount of potential energy is proportional to the mass (weight, volume) of the balls 300, as well as to the elevation at which they are located from the center of the Earth planet.

To generate electric power, (called discharging the gravity battery), just as in water-based hydro-electricity, the balls 300 in the upper storage reservoir 1100 are allowed to drop downwards, under gravity, towards the center of Earth, into and through the drop-down system 1200 and into the power generation system 1400. The maximum potential energy, eventually kinetic energy, possible is proportional to the difference in elevations of the upper storage reservoir 1100 and the lower storage reservoir 400 (considering the latter is co-located with the power generation system 1400). The difference in elevations, is called head in the hydro-electricity community of practice. The kinetic energy of the ball 300 is converted into rotational energy in a turbine, at some efficiency. In turn, the turbine's rotational energy is converted into electro-dynamic energy (due to flow of electrons) in the power generation system 1400, again with some efficiency. The fallen balls 300, now in the lower storage reservoir 400, are then uplifted in the first uplift system 500 of facility's part-1, or in the second uplift system 900 of facility's part-2, and placed in the upper storage reservoir 1100, so that the cycle of the flow of the balls repeats. As is well-known, water in the natural environment is raised to form rain clouds by means of processes of evaporation. The water moisture in the rain clouds precipitates as rainwater. The rainwater is collected, high in the sky, by part-3 of the facility and integrated with the balls 300 of part-1 and part-2 of the facility and stored in the upper storage reservoir 1100.

The facility 100 includes three pathways (also referred to as parts) for uplifting masses to the upper storage reservoir 1100. A first part uses electricity to power a first uplift system 500 (see FIG. 5, FIG. 6, FIG. 7 and FIG. 8), labeled as Uplift-1 in FIG. 1, that uplifts balls 300 in order to increase their gravitational potential energy. The electric power to raise the balls 300 in the first part can come from a power grid or from any renewable energy resource or energy storage system. When power is demanded from the energy storage facility 100, the raised balls 300 are down-dropped to drive turbine-generators, in order to generate electricity, via ballistic optimized hydro-electricity production or other means of granular stream electric power generation. This first part is termed a pumped-storage hydro-electricity analog simulator facility. It is also called Ballistic Optimized Hydro-Electricity Production.

A second part supplements the first part by using a second uplift system 900 (See FIG. 9), labeled as Uplift-2 in FIG. 1, that provides thermal convection currents to provide lift. The second uplift system 900 is powered by solar radiation 913, waste-heat thermal energy 905, and/or geothermal heat energy 907, directly, (instead of first converting the heat into electricity), to uplift aerodynamic bodies 916 (see FIG. 9) to increase their gravitational potential energy. Wind energy can also be used to directly raise the aerodynamic bodies 916. The raised aerodynamic bodies 916 are packaged in containers and then integrated with the balls 300 of the first part. The integrated aerodynamic bodies 916 from the second part can then participate in ballistic and granular optimized electric power generation. This second part is called a simulator for the uplift portion of a hydro-electric power generation because the behaviors of the aerodynamic bodies 916 are analogs of the water evaporation process in a hydro-electric process.

A third part of the facility uses a third uplift system 1000 (see FIG. 10), labeled as Uplift-3 in FIG. 1, to supplement the first part, or the first and second parts. Rainwater is collected high above ground and is then integrated as a payload within the balls 300 of the first part and/or aerodynamic bodies 916 (see FIG. 9) of the second part. The stored rainwater from the third part can then participate in ballistic and granular optimized electric power generation. This third part is called a simulator for hydro-electric power generation, based on the natural hydro-cycle. The mass of water in rain clouds is elevated by means of the natural process of evaporation. The balls 300 from the lower storage reservoir 400 function as working fluids and are stored together in the upper storage reservoir 1100. Thus, the same drop-down system 1200 is used consistently in electric power generation in the packet gravity energy storage system facility.

In one embodiment, the disclosed facility is an integration of three loops to support electric power generation that are unified at the manifold 102. The overall facility is also referred to as (granular, quantum, digital) Packet Gravity Energy Storage System or Packet Gravity-Based Energy Storage System. The presence of the second and third parts provides two advantages. First, they increase the overall efficiency of power generation (during gravity battery discharge) of the facility as an energy storage system. Furthermore, they provide the possibility of operating the facility continuously, and thus for it to act as a primary electric power generation source, instead of merely playing the role of an energy storage system. A hybrid first part and second part facility also provides a useful embodiment for extraterrestrial gravity-based electric power generation on Mars, the Moon and other planets, satellite planets and planetoids, where ever there is a significant atmosphere.

Figure 2:
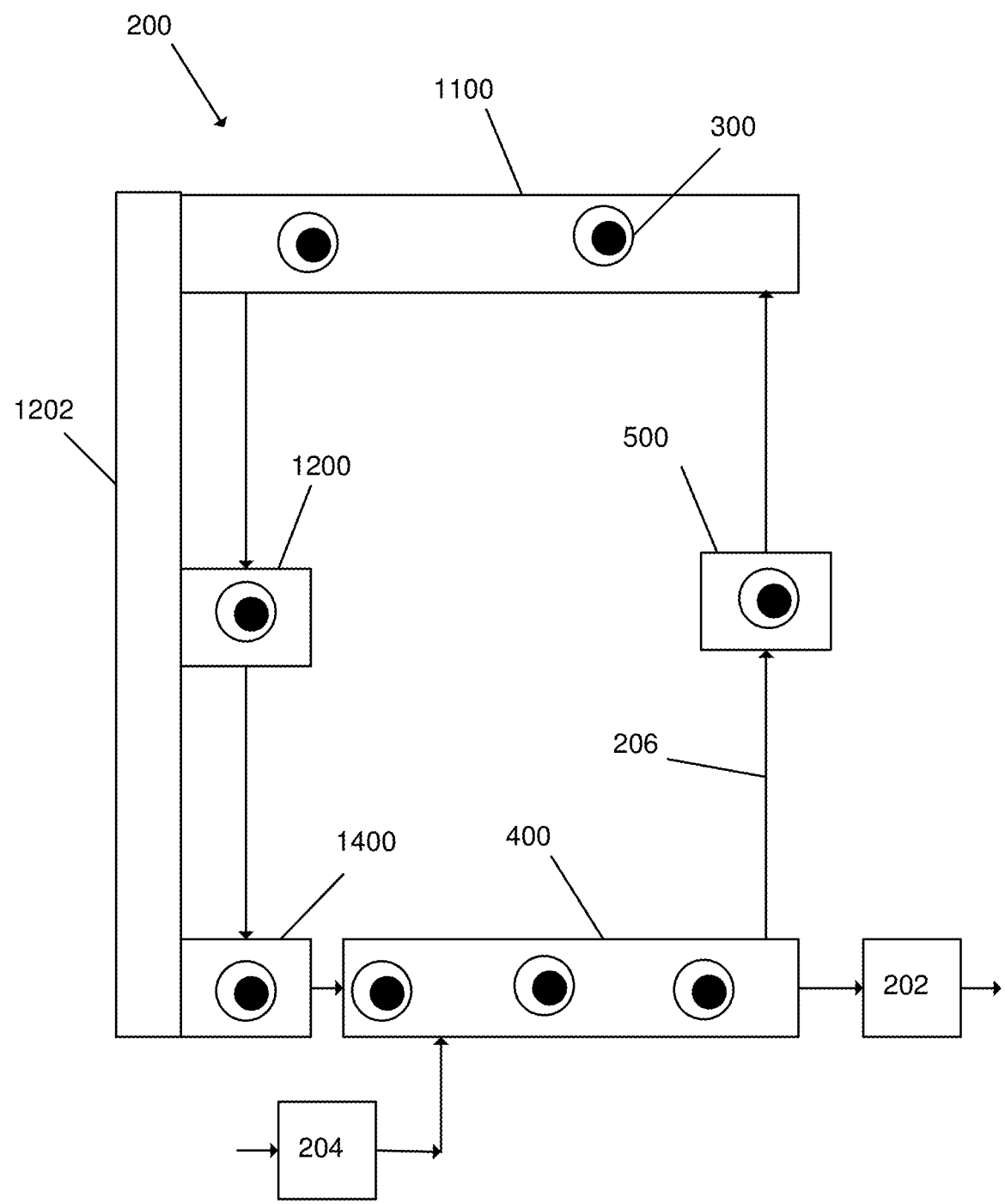
FIG. 2 is a schematic diagram of one facility for energy production.

FIG. 2 is a schematic depiction of a facility 200 that includes just the first part of the disclosed facility. The operating model of the facility 200 is the same model that underlies all variants of gravity energy storage systems (gravity batteries).

FIG. 2 depicts an energy facility 200 that comprises the lower storage reservoir 400, the upper storage reservoir 1100, the first uplift system 500, the drop-down-system 1200 and the power generation system 1400. The energy facility 200 further comprises a plurality specialized balls 300. Each of these systems are fluidly connected by conduits 206 as depicted in FIG. 2.

The first uplift system 500 is powered by an external electrical power source such as from grid 505, or electricity ultimately sourced from any renewable energy resource (e.g. wind or solar power 507) or energy storage system (e.g. battery storage system 509). Additional energy sources include fuel cells 511, flywheels 513 and thermal energy storage system 515. Advantageously, the external power can be provided from a renewable energy resource when environment conditions permit (e.g. when sunshine is available during daylight hours). This external power is essentially stored in the potential energy of the balls 300 located in the upper storage reservoir 1100, for subsequent use. When the environmental conditions are not sufficiently favorable for renewable energy to be utilized (e.g. nighttime for solar power, calm weather for wind power, etc.) the stored potential energy of the balls 300 can then be utilized to provide environmentally-friendly energy.

Unlike water, the balls 300 do not evaporate over time and are therefore useful in a wider variety of climates and under a broader range of weather conditions. The balls of the invention have the advantage of being encapsulated, so that the external environment is protected from the presence and material effects, at the same time, the balls are also protected from environmental conditions.

The balls 300 can be of a variety of sizes ranging from granular (e.g. 0.1 mm to 2 mm), pearl sized (e.g. 0.5-1 cm), rock sized (e.g. 2 cm to 8 cm) to boulder sized (e.g. 0.5-1.5 meters). In one embodiment, balls 300 have an overall spherical shape. As used in this specification, the term "ball" refers to any spherical, spheroid, oblate, ovoid, egg-shaped, or eggoid package. The ball 300 can, in different embodiments, range in size (diameter) to be the size of an oil palm nut, golf ball, ping pong ball, rubber latex condom ball, tennis ball, hand ball, baseball, racket ball, bowling ball, boule ball, football, rugby ball, grapefruit size, brick size, cement block size, concrete block size, soccer ball, volleyball, basketball, breadfruit size ball or coconut size ball (about 1 gallon to 5 gallon size). The ball can also be of any non-spherical but compact, lumpy and round shape and form.

Figure 3:
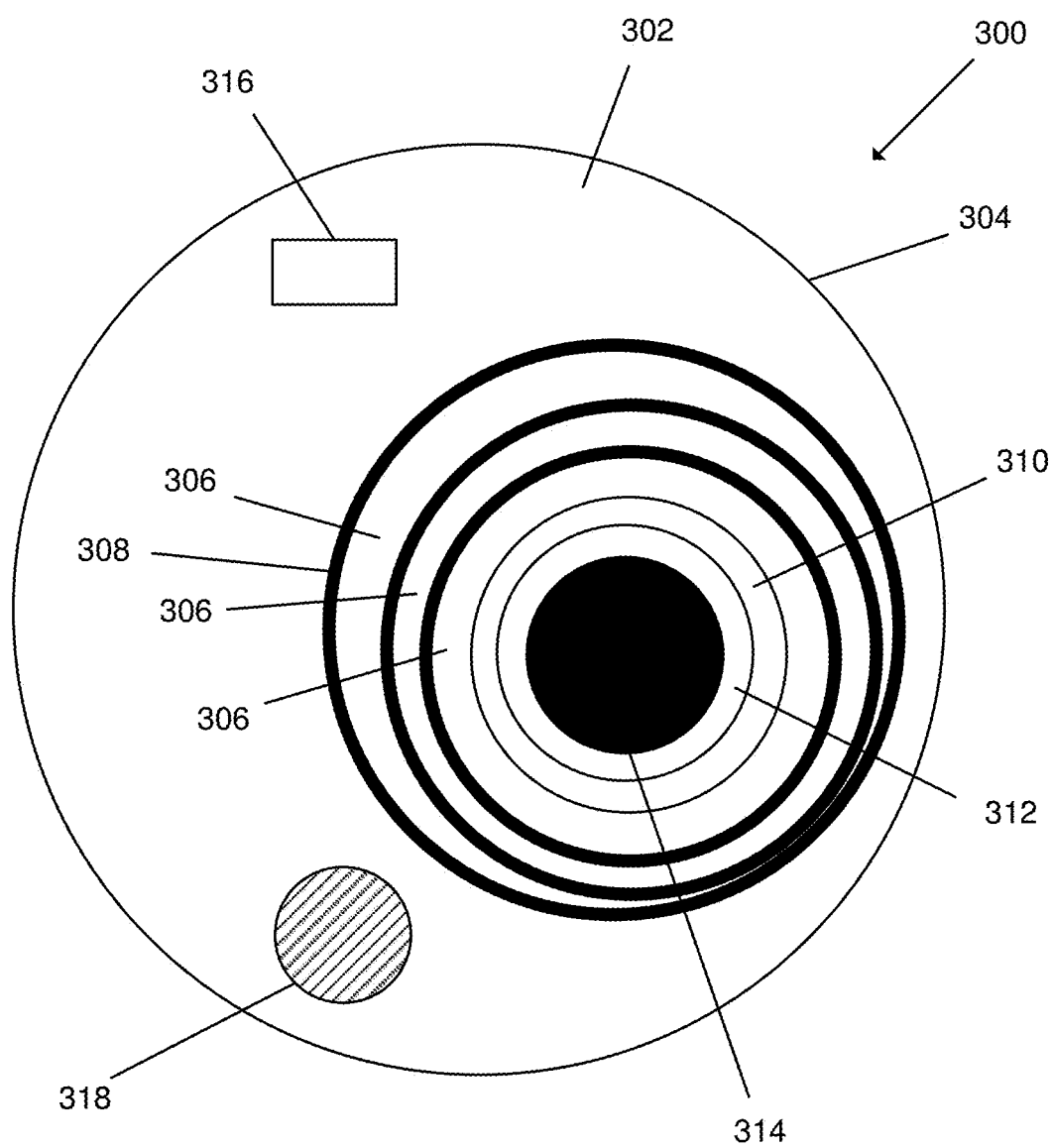
FIG. 3 is a cross section of one ball for use with the disclosed facility.

However, all the other internal components of the ball 300 (see FIG. 3) can be implemented in any suitable shape, including spheroids, oblates, blocks, laminates, sheets, films, rolled films, arrays, matrices, polyhedra, tessellations, tensegrity structures. FIG. 3 depicts one embodiment of the specialized balls 300 in further detail. These internal components are depicted as spheres in FIG. 3 for simplicity of illustration.

In FIG. 3, the balls 300 comprise an outer layer 302 with a surface 304. In one embodiment, the surface 304 has the same composition as the outer layer 302. In another embodiment, the surface 304 has a coating with a composition that is dissimilar to the composition of the outer layer 302. Such a coating provides a variety of ways of making the ball 300 continuously behave in different fluid-like manners. In one embodiment, the surface 304 is an elastomeric material, such as rubber, that increases the elasticity of collisions to render the ball 300 particularly prone to bouncing.

In one embodiment, the outer layer 302 is formed using layers, wraps, sheets, sleeves, meshes fabrics, or coatings of plastic polymers, such as, polycarbonate (PC), polyvinyl chloride (PVC), high-density polyethylene (HDPE). In another embodiment, the outer layer 302 is formed using shells, meshes, nets of metals or metal alloys, such as aluminum, steel. In another embodiment, the outer layer 302 is formed using materials of agricultural, plant, vegetable or animal origin, such as leather, textile fabrics, sheets, nets, meshes, baskets. In another embodiment, the outer layer 302 is formed using fill-in materials, including coconut coir, packing materials from agricultural wastes and residuals. In one embodiment, the outer layer 302 is formed from a water-absorbent material such that it can be saturated with water and thereby make the ball 300 heavier. In another embodiment, the outer layer 302 is formed using polymeric foams used for package cushioning, including foam "peanuts" of expanded polystyrene, polypropylene, polyethylene, polyurethane. In another embodiment, the outer layer 302 is implemented by using elastic polymers (elastomers), that can be used as shock absorbing materials, including dienes (polyisoprene, polybutadiene, polychloroprene), non-dienes (butyl rubber, polyisobutylene, polysiloxane (silicone rubber), polyurethane (spandex), fluoro-elastomers (fluoro-silicone, fluoro-carbon), silicone, neoprene, urethane thermoplastics, Betagel (silicone and gel composite). In another embodiment, the outer layer 302 is implemented using high energy absorbing polymers, composites, bio-inspired composites.

The ball 300 further comprises at least two inner layers 306. In the embodiment depicted in FIG. 3, three such inner layers 306, each sequentially disposed inside the other, are depicted. The inner layers 306 performs a role similar to the role of the husk or coir in the coconut drupe fruit. The inner layers 306 provide at least two layers of elastomers that act like compression springs, to influence the transfer of kinetic energy from the ball 300 to the turbine. In an embodiment, the elastomers are rubber products from natural rubber or visco-elastic materials such as the material sold under the brand name SORBOTHANE(R).

In between the inner layers 306 is a multi-layer sandwich of hardened, impenetrable dividers 308 (for example, made of bullet proof or explosion-proof materials). Each dividers 308 is customized, for example to be impenetrable to all fluids: all liquids, oil and water, and all gases. Inserted between the dividers 308 are the inner layers 306.

In one embodiment, the dividers 308 are composite materials, such as fiber reinforced composites, ceramic composites, silica composites, fiber glass, carbon fibers. In another embodiment, the dividers 308 are rigid packaging materials, such as hard plastics, glass or metals (including, aluminum and tin). In another embodiment, the dividers 308 are metals or metal alloys, including those typically approved for use in medical devices, such as aluminum, gold, nickel-titanium alloy, platinum, silver, stainless steel, titanium. In another embodiment, the dividers 308 are laminates employed in blister packaging, (including: ALU, PETM, transparent PET). In another embodiment, the dividers 308 are alumina ceramics or zirconia ceramics. In another embodiment, the dividers 308 are high impact resistance polymers, thermoplastics and plastics, including: ABS (acrylonitrile butadiene styrene), polycarbonate (PC), high-density polyethylene (HDPE), polyamide-imide (PAI), high impact polystyrene (HIPS), ultra high molecular weight polyethylene (UHMW, UHMWPE). In another embodiment, the dividers 308 are high impact resistance composites, including KEVLAR™, Nomex™, Technora™, Twaron™; hybrid composites; carbon fiber-polyethylene composites; laminated Kevlar-epoxy composites; fiber-epoxy resin matrix composites, where the fibers used include aramid fibers, carbon fiber, glass fiber.

The ball 300 further comprises an endosome layer 310 that is designed to cushion a payload container 312 and act as a shock-absorber system. In one embodiment, the endosome layer 310 comprises elastic bars or rodlets, elastomeric spring systems, made from natural rubber latex, rubber polymers, nitrile rubber polymers, polysiloxanes. In another embodiment, the endosome layer 310 comprises elastic polymers with shock absorbing materials, including dienes (polyisoprene, polybutadiene, polychloroprene), non-dienes (butyl rubber, polyisobutylene, polysiloxane (silicone rubber), polyurethane (spandex), fluoro-elastomers (fluoro-silicone, fluoro-carbon), silicone, neoprene, urethane thermoplastics. In one embodiment, the endosome layer 310 incorporates a synthetic visco-elastic shock absorber polymers and rubbers, such as the polyurethane-based polymer sold under the brand name SORBOTHANE (R), chloroprene-based neoprene foam, silicone, polyethylene foam, and butyl rubber.

The payload container 312 is made of an elastic extendable material, such as latex rubber, for example as used in condoms, so that it can distend like a bladder bottles. In one embodiment, the payload container 312 is compartmentalized into cargo cells, much like honeycombs of honeybees, bulkheads of ships and boats, or cellular networks of fire bags or fire zones. The materials used for the cell partitions may be fire-resistant. The design has the advantage that small volumes of payload (which are sometimes fuels) are used within each cargo cell, and the spread of fires and explosions can be limited in the ball 300, so the balls 300 are not compromised to leak or spill fluids and impact other balls 300 or the external environments.

The payload container 312 may be in the form of a container including: bottle, jar, jug, can, vial, ampoule, bag, pouch, carton, tube, tubing, pipe, hose, wrapping tissue, film, stretch film, foil, sheet, roll tape, rope, wire, cable, string, thread, wrap, tray, bowl, cup, socks, packaging box, and basket. The payload container 312 can be formed using any packaging material, in any form factor, from any industry sector (including food, industrial, medical, agricultural). The packaging materials include, but are not limited to, glass, paper, paperboard, fiberboard, cardboard, wood, metalized film, cloth, fabric, textile, metals (including: steel, aluminum, copper), ceramics, plastics (including thermoplastics; thermoplastic polymers; plastic resins; including: polyethylene terephthalate (PET, PETE); polypropylene (PP); PP-with-chalk; high-density polyethylene (HDPE); low-density polyethylene (LDPE); polyethylene terephthalate glycol (PETG); polyethylene (PE); polyvinyl chloride (PVC); polycarbonate (PC); polystyrene (PS); high-impact polystyrene (HIPS)); bio-based plastics, bio-polymers; composites (polymer composites, ceramic composites); film (including: stretch film, shrink film, bundling film (from PVC, PE, polyolefin (POF)), shrink band). The packaging materials may be formulated and customized to meet requirements of being bio-compatible, bio-degradable, food-grade, medical grade as well as qualities and properties of temperature resistance, impact resistance, corrosion resistance, high wear and tear resistance.

The ball 300 further comprises a payload 314. The payload 314 can be a wide variety of compounds, solid or liquid. Thus, the payload 314 can include but is not limited to sand, beach sand, desert sand, mining tailing, industrial powders, food processing powders, agricultural waste. Solid phase materials such waxes, asphalt, bitumen can be broken up into powder and made into paste, but can also be liquefied into jellies, before being used as the payload 314. Specific examples of payload 314 include water (fresh water, rainwater, river water, seawater, brackish water, brine), oils (derived from petroleum hydrocarbons, other fossil fuels, vegetable oils or animal fats), wastewater from municipal sewage; industrial waste, tire graveyard waste, battery graveyard waste, mine tailings and mine overburden, shredded or melted waste plastics from garbage dumps, landfills, ocean waste pools, concrete, bricks, limestone, cement. Advantageously, the disclosed systems permit one to utilize otherwise troublesome waste material as a mass in the disclosed energy generation process. At the same time, the structure of the ball 300 ensures that the payload 314 remains sequestered from the environment, thus safely converting a waste material into a mass useful in energy production.

In some embodiments, the payload 314 avoids using compounds that exist as volatile organic compounds (VOC) or gases (VOG) or can readily convert into such volatile and potentially ignitable and explosive materials. In some embodiments, for aesthetic reasons, sulfur or sulfur compounds are avoided. Thus, suitable payloads 314 include esters, polyesters, amides, fatty acid, triglycerides and generally exclude ethers, ketones, aldehydes, amines.

In one embodiment, a piezo-electric power module 316 is present in the outer layer 302 to capture energy from the contact impacts the ball 300. The generated electricity can be stored in a battery in the piezo-electric power module and later extracted when ball 300 when not in use. In one embodiment, the piezo-electric power module 316 is inserted between the dividers 308, to capture energy from the impacts of the ball 300.

In one embodiment, the ball 300 further comprises a weight 318 which may have a mass that is greater than the mass of a basic ball 300. The weight 318 is used to modulate the mass of the ball 300. In this manner, the potential energy and kinetic energy can be controlled. The use of a relatively small heavy weight 318 permits the overall mass of the ball 300 to be adjusted while still permitting less expensive materials to be used for the majority of the components. Examples of suitable materials for the weight 318 include metals such as lead or tin or alloys such as stainless steel or brass, as well as concrete and cement.

In some embodiments, the small secondary balls (0.03 inch to 0.5 inch in diameter) balls made from superdense or superbouncy rubber balls and elastic polymers (or elastic coated core glass, plastic, agate, steel, fired clay balls) are used in conjunction with the balls 300. They are used to fluidize collections of balls 300, so that balls 300 can be in constant motion, thus flowing like a liquid fluid, when desired. Because specific sizes can be deliberately chosen for the secondary balls, the fluidization of balls 300 becomes field programmable.

Figure 4:
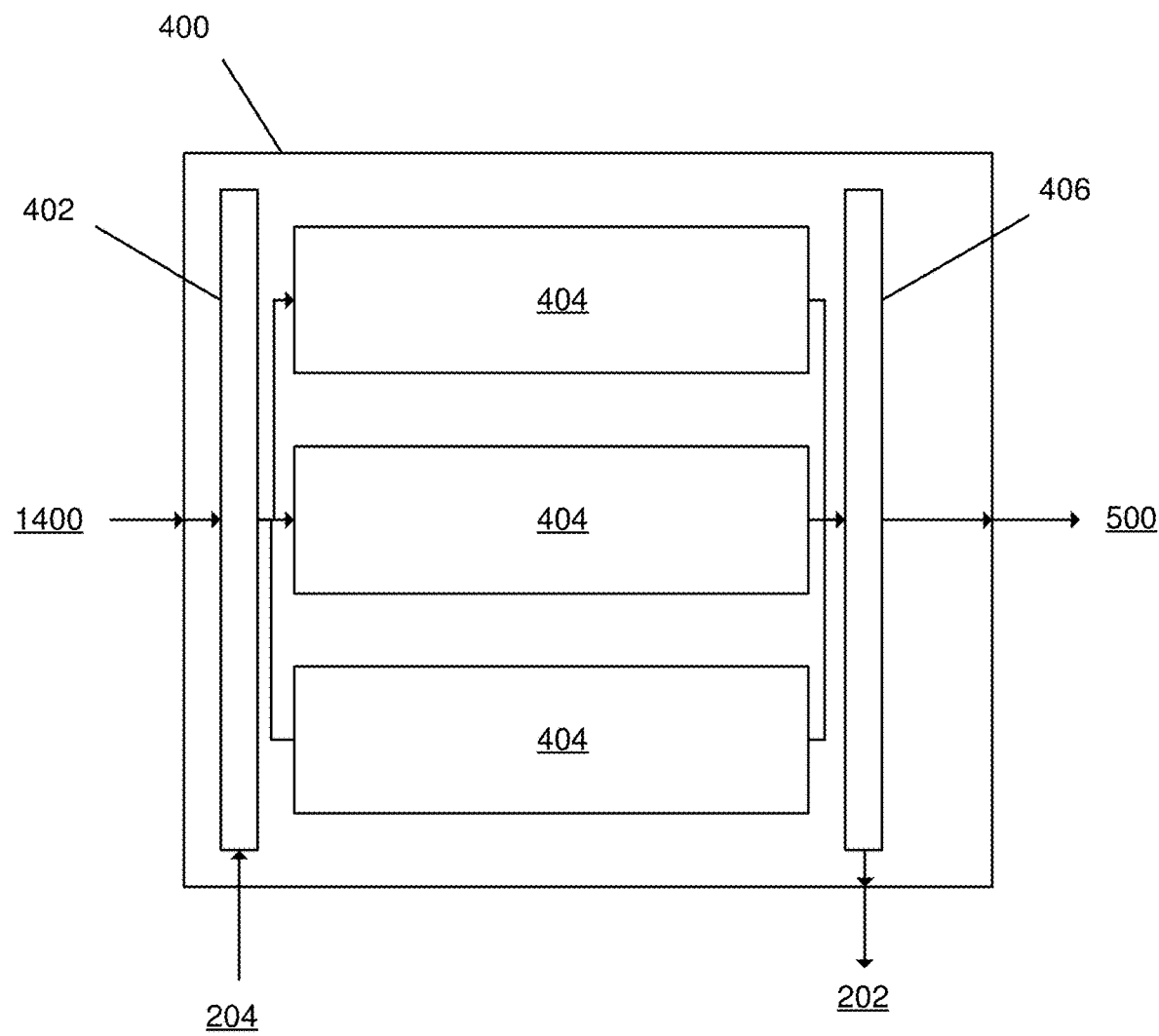
FIG. 4 is a schematic depiction of a lower storage reservoir.

Referring to FIG. 4, the lower storage reservoir 400 comprises an intake manifold 402, at least one lower storage container 404, and an output manifold 406. Bulk and packaged material transfer and transport structures, such as conduits, connect these component subsystems to each other. For simplicity of illustration the conduits are depicted as thin lines to show fluid connections however, the conduits have a diameter sufficient to permit the balls 300 and containers of balls to pass. In one embodiment, the lower storage containers 404 are large diameter HDPE pipes. In the embodiment of FIG. 4, the lower storage containers 404 are constructed as modular tube storage containers for ease of storage management, as well as for supporting automated storage and retrieval. In a large-scale embodiment, the lower storage containers 404 have dimensions of, for example, 10 feet by 10 feet by 20 feet; or 10 feet by 10 feet by 40 ft or 10 feet by 10 feet by 50 ft, comparable to storage structures of cargo containers.

The first uplift system 500 may be embodied in a variety of forms. Examples of suitable uplift systems include (both electrified and non-electric) cranes, gantries, jack lifts, stairlifts, car lifts, vertical conveyor belts, baggage carousels, pulley and wire cable systems, bucket conveyors (belt, chain, cable), Archimedes screw and screw conveyors, elevators, escalators, aerostats (filled with hot air, helium, hydrogen): e.g, balloons blimps, dirigibles, zeppelins), aerodynes: (aircraft, helicopter, drone, unmanned aerial vehicles); vertical maglev systems, vertical rail, tube-and-rail systems; hoist-winches and pneumatic vacuum elevators. If a single piece of equipment is not able to span the elevation needed, then a multi-stage equipment can be used to cover the elevation. In that case, a hybrid scheme can also be implemented, whereby different technical schemes are used at different stages of the uplift system. In one embodiment, the uplift system 500 is a vertically stacked cascade of water lifting wheels (modified to lift granular materials instead of water) and powered by waterwheels whereby the treading is not from human power or animal power; instead, is either based on energy storage systems, such as battery storage system 509 or electricity from wind or solar power 507, solar thermal radiation 517, hydropower 519. Therefore, the key issue concerning the uplift system 500 is not technical feasibility, but rather cost, both initial capitalization and ongoing operational costs. These and other suitable means for uplifting the balls 300 from the lower storage reservoir 400 to the upper storage reservoir 1100 would be apparent to those skilled in the art after benefiting from reading this specification.

In one embodiment, the first uplift system 500 uplifts one or more individual balls 300. In another embodiment, the first uplift system 500 uplifts a plurality of balls that have been packed into a container. The balls 300 may be placed in containers during the use of the first uplift system 500. In one embodiment, at the end of an uplift, the balls 300 are not removed from the container. Instead, the container and its contents are taken out of the first uplift system 500 together and transferred to be stored in the upper storage reservoir 1100. Examples containers include airlift bags which have tough materials for the bag fabric material. In some embodiments, the balls 300 are then removed from the containers and re-introduced to the upper storage reservoir 1100 as individual balls.

Figure 5:
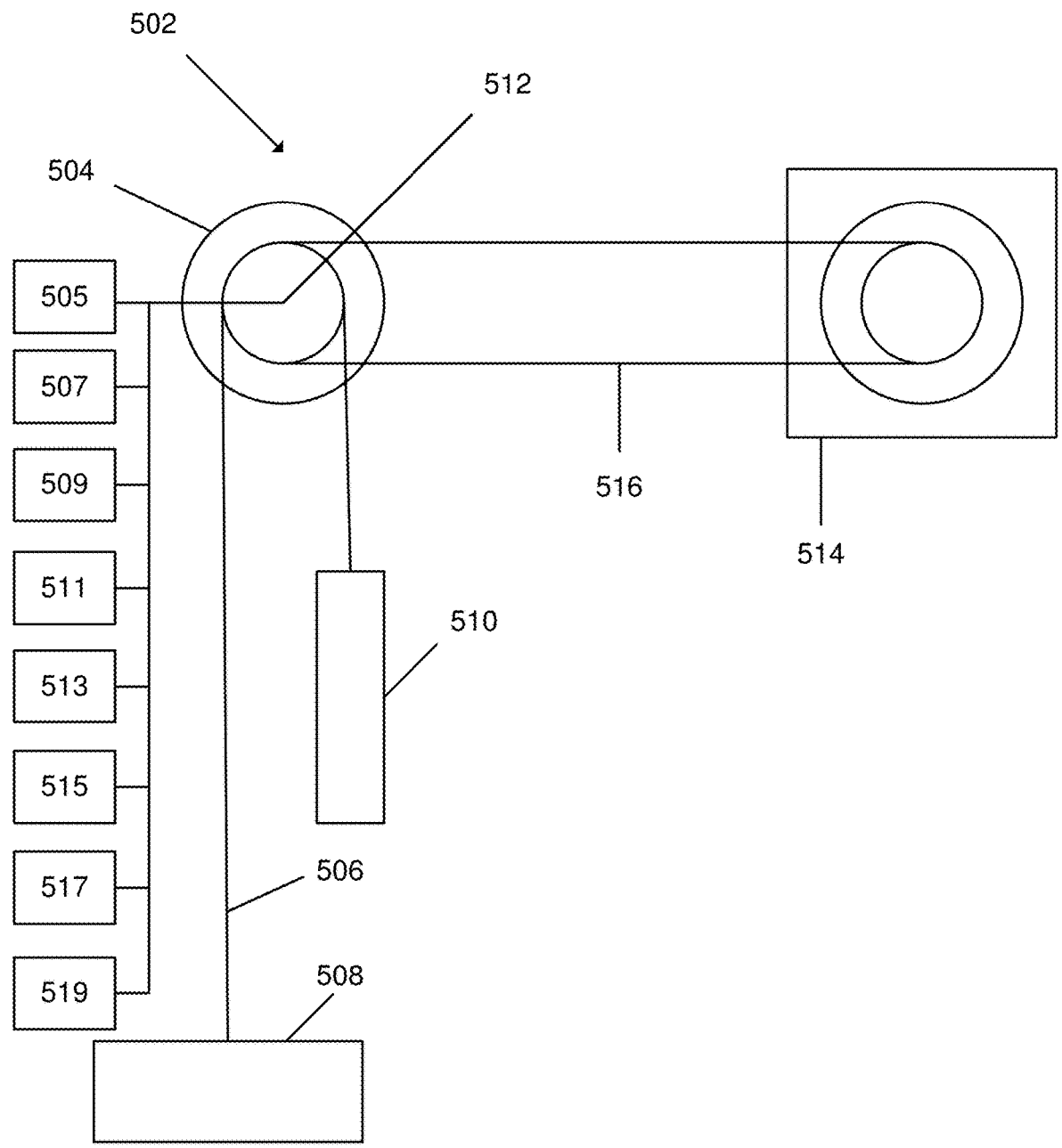
FIG. 5 is a schematic depiction of a first uplift system.

Referring to FIG. 5, in one embodiment, the first uplift system 500 is a winch-hoist-cable uplift system 502. A drum 504 has wound around it a cable 506, with the cable's two endpoints connected to payload 508 to be uplifted and a counterweight 510, respectively. The arrangement is used to uplift and is driven by an embedded in-hub motor-generator 512 operating as a motor. The arrangement can also be driven by a separate motor-generator 514 connected to the winch-hoist-cable using a belt or gear 516.

A characteristic feature of extant systems, gravity batteries, is that the same winch-hoist-cable system is typically used for both the uplift and down-drop sides or sections of the facility for energy storage and power generation. Thus, such a winch-hoist-cable system can only alternate between gravity battery charging (storage) and gravity battery discharging (power generation) of the energy storage system. In such an embodiment, the energy storage system cannot operate in both modes in simultaneously.

Another embodiment is to use multiple winch-hoist-cable systems on the down-drop side, and thus, have a facility with parallel winch-hoist-cable based power generators. Another embodiment is to use multiple, parallel winch-hoist-cable systems, to support each down-drop load, packet, bundle, cab.

Figure 6:
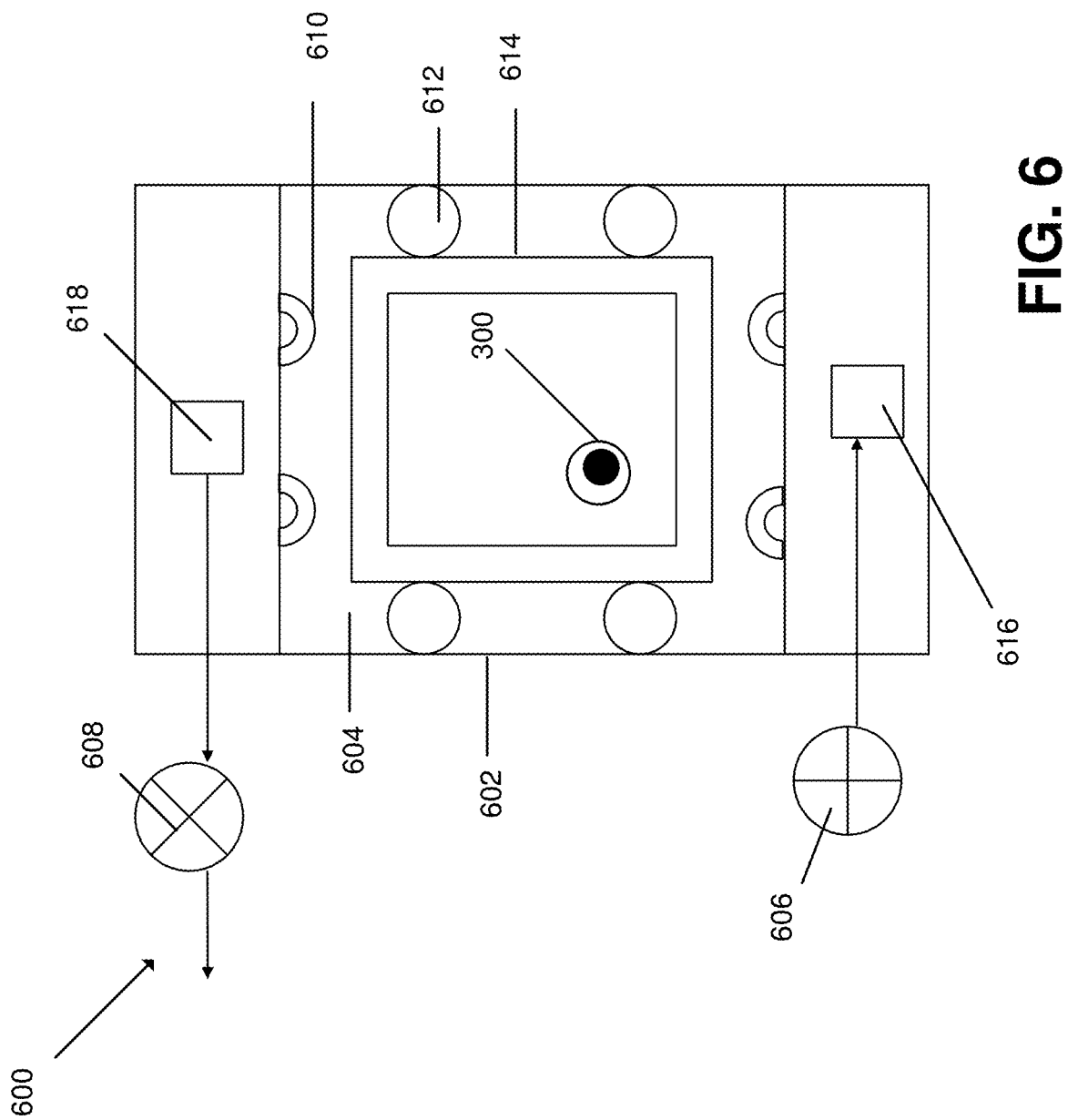
FIG. 6 is a cross section of a pneumatic vacuum elevator uplift system.

FIG. 6 depicts another embodiment of the first uplift system 500 that specifically employs a pneumatic vacuum elevator uplift system 600. The pneumatic vacuum elevator uplift system 600 comprises a shaft 602 of suitable height to traverse the elevation. The shaft 602 is fitted with a tube constructed inside as a sealed air compartment 604. Multiple tubes can be stacked and coordinated with a peristaltic mechanism for shaft lengths greater than 100 feet. Inflow air pumps 606 and outflow air pumps 608 are to used pump air into or out of the sealed air compartment 604. An elevator cab 614 is positioned inside the shaft 602. The elevator cab 614 can carry at least one of the balls 300. In operation, to cause the elevator cab 614 to ascend, inflow air pump 606 is actuated to introduce air through an airflow junction 616 and into the bottom of the sealed air compartment 604. In one embodiment, air is permitted to escape the top of the sealed air compartment 604 through an opening. In another embodiment, air is actively removed from the top of the sealed air compartment 604 by actuating outflow air pump 608 that withdraws air through an airflow junction 618. The difference in air pressures creates a lift that causes the elevator cab 614 and its payload to rise from a lower to a higher elevation, within the shaft 602. The cab 614 and its balls 300 are together transferred as payload to be used on the down drop side. There are stops 610 within the bottom and top of the shaft 602. The movement of the elevator cab 614 in the shaft 602 is supported by roller guides 612. In one embodiment, the elevator cab 614 is permitted to return down the sealed air compartment 604 by gravity. In another embodiment, the elevator cab 614 never descends and, instead, is removed from the sealed air compartment 604 along with the balls 300.

Figure 7:
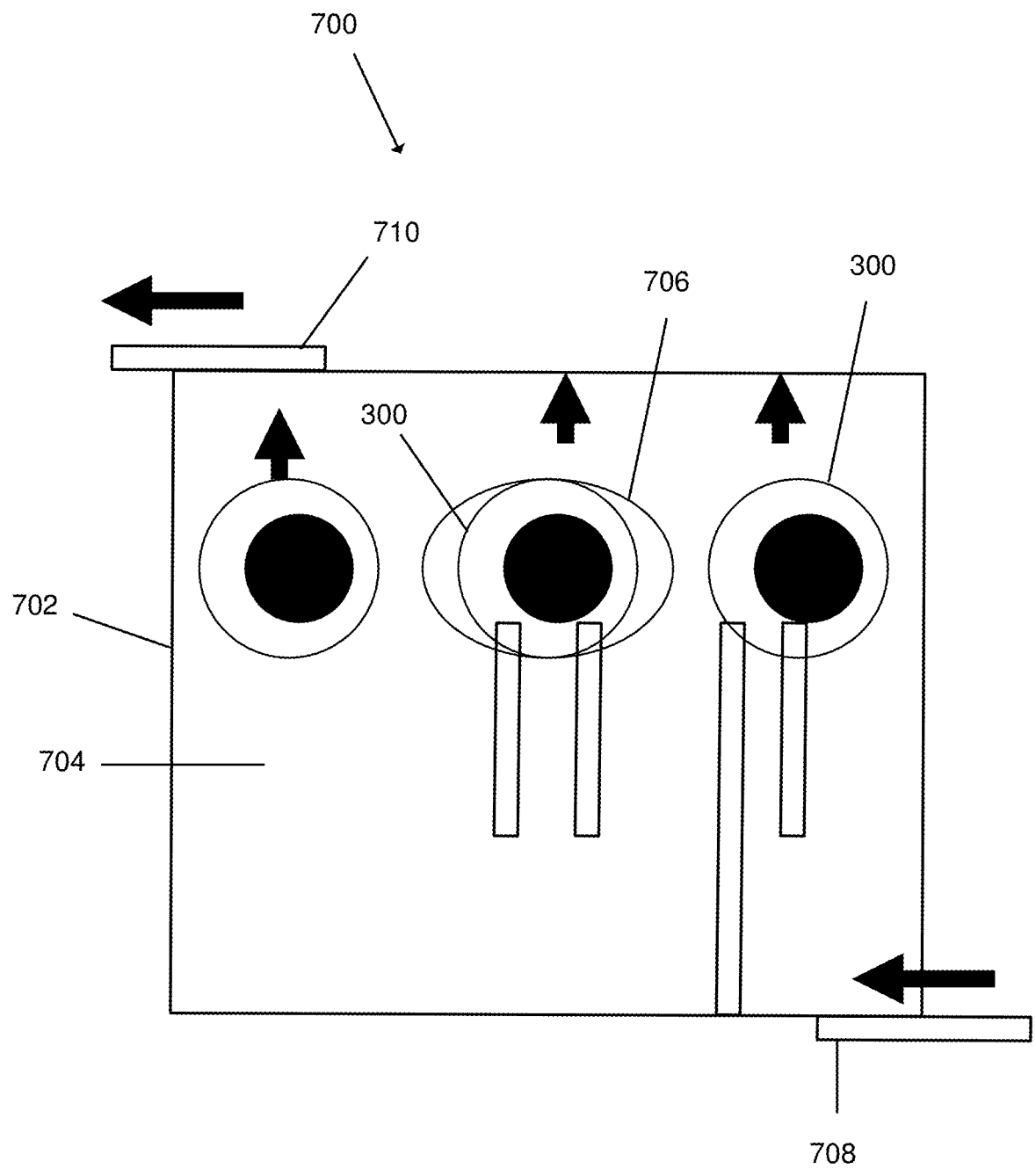
FIG. 7 is a cross section of a buoyancy uplift system.

FIG. 7 depicts another embodiment of the uplift system 500 that specifically employs a buoyancy uplift system 700. The buoyancy uplift system 700 uses lighter-than-water buoyancy to provide lift. Thus, a water tower 702 is depicted that is filled with a liquid solution 704. The liquid solution 704 can be water, a water-based liquid (e.g. salt water) or any non-flammable liquid which has a density comparable to that of water (e.g. 1.0 g per mL to 1.1 g per mL). In some embodiments, buoyant containers 706 (relying on air, hot air, helium or any lighter-than-water substance) are used as cargo haulers of the balls 300 from a bottom loading station 708 to a top loading station 710. The buoyant containers 706 have a density that is less than the density of the liquid solution 704. The buoyancy uplift system 700 can be implemented using pipes made from plastics and plastic fabrics. The buoyant containers 706 are loaded with waterproof balls 300 from outside the water tower 702 and inserted into the water tower 702. At the top elevation, the buoyant container 706 and its ball 300 are removed by a transfer unit (e.g. a cart) that transports them as a bundle to be stored in the upper storage reservoir 1100. In one embodiment, multiple water towers 702 are built. In another embodiment, a single water tower 702 is built and overhead conduits laterally distribute the buoyant containers 706 from the single water tower 702 to one or more upper storage reservoirs 1100. In one embodiment, this conduit network forms a dome. In one embodiment, a geodesic dome with solar panels is constructed around the water tower 702, specifically for the solar electricity generation for ballistic optimized power production.

Figure 8:
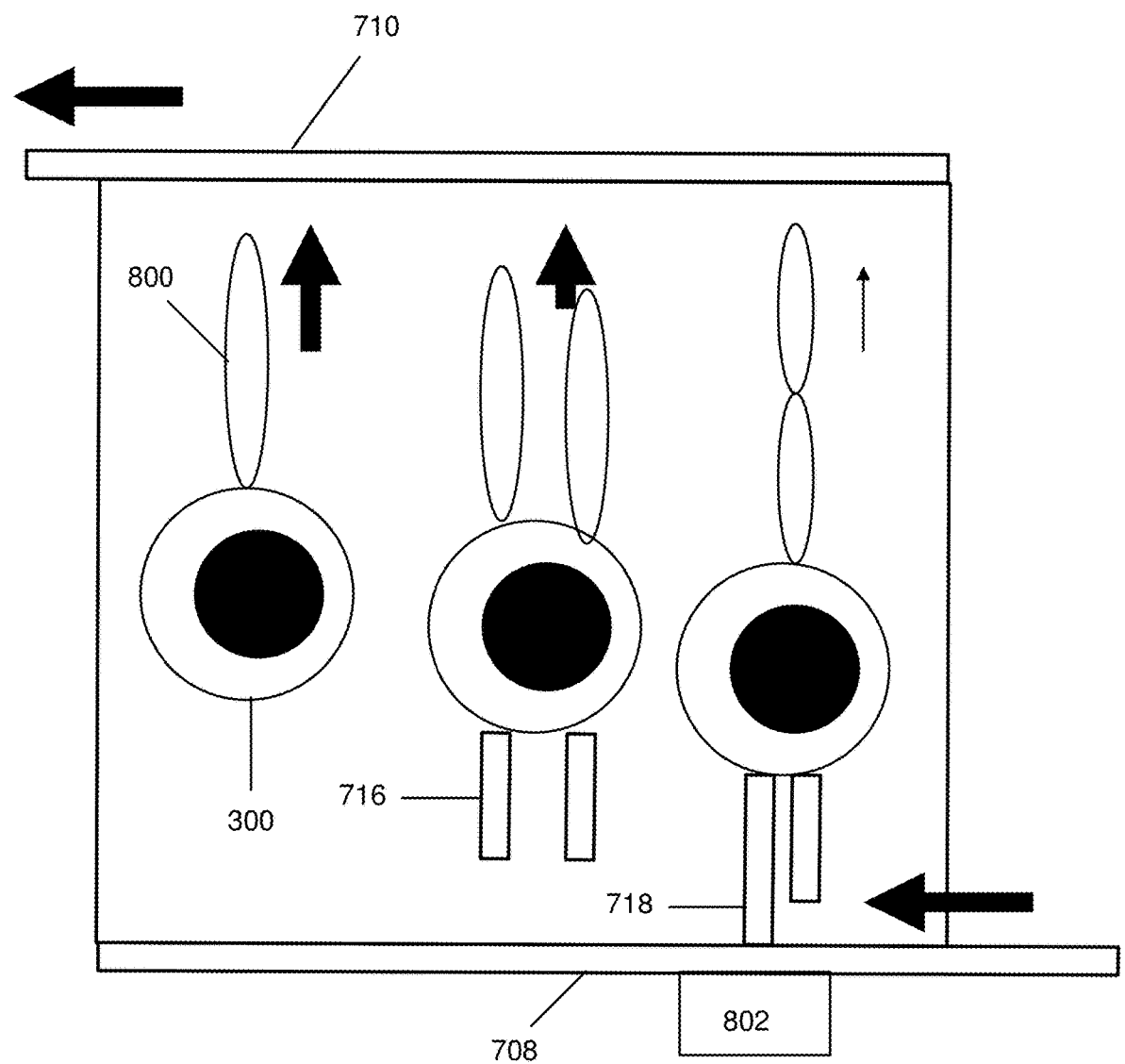
FIG. 8 is a cross section of a buoyancy uplift system that uses aerostats.

Referring to FIG. 8, in one embodiment, the balls 300 comprise a gas-filled aerostat 800 (e.g. a balloon) filled with any non-flammable and non-explosive, inert gas. The gas-filled aerostats 800 may be disposed around the balls 300 (e.g. a bag) or may be balloons within the balloon 800 (e.g. an inflatable bladder). The gas-filled aerostats 800 can be embodied in a form biomimetrically similar to jellyfish, with umbrella-like bell and trailing, flexible tentacles 716. One or more of the tentacles (e.g. tentacle 718) can be tethered to the bottom loading station 708. The tentacles 718 are used to pump air or other inert gas in and out of the gas-filled aerostats 800 (through pathways in the bottom loading station 708) and thus, alter the buoyancy of the balls 300. In one embodiment, the gas-filled aerostats 800 are elongated tube-shaped containers. The vertical elongation of the container means its lateral dimension can be reduced to keep the same volume. The gas-filled aerostats 800 and tentacles 718 may also be used in conjunction with the buoyant containers 706. In one embodiment, the tentacles 718 are reeled into a compartment of the buoyant container 706 they are connected to after being disconnected at the ground level from a pump 802. By disconnecting tentacles 718 from the buoyant container 706, the tentacles 716 are produced. In another embodiment, the tentacles 718 are disconnected from the buoyant container 706 and reeled into the pump 802 on the ground level. In another embodiment, the tentacles 718 are disconnected at both ends of the tentacles 718 and move out of the way of the uplift flow path The payload is removed at the top by the unloading station 710.

Figure 9:
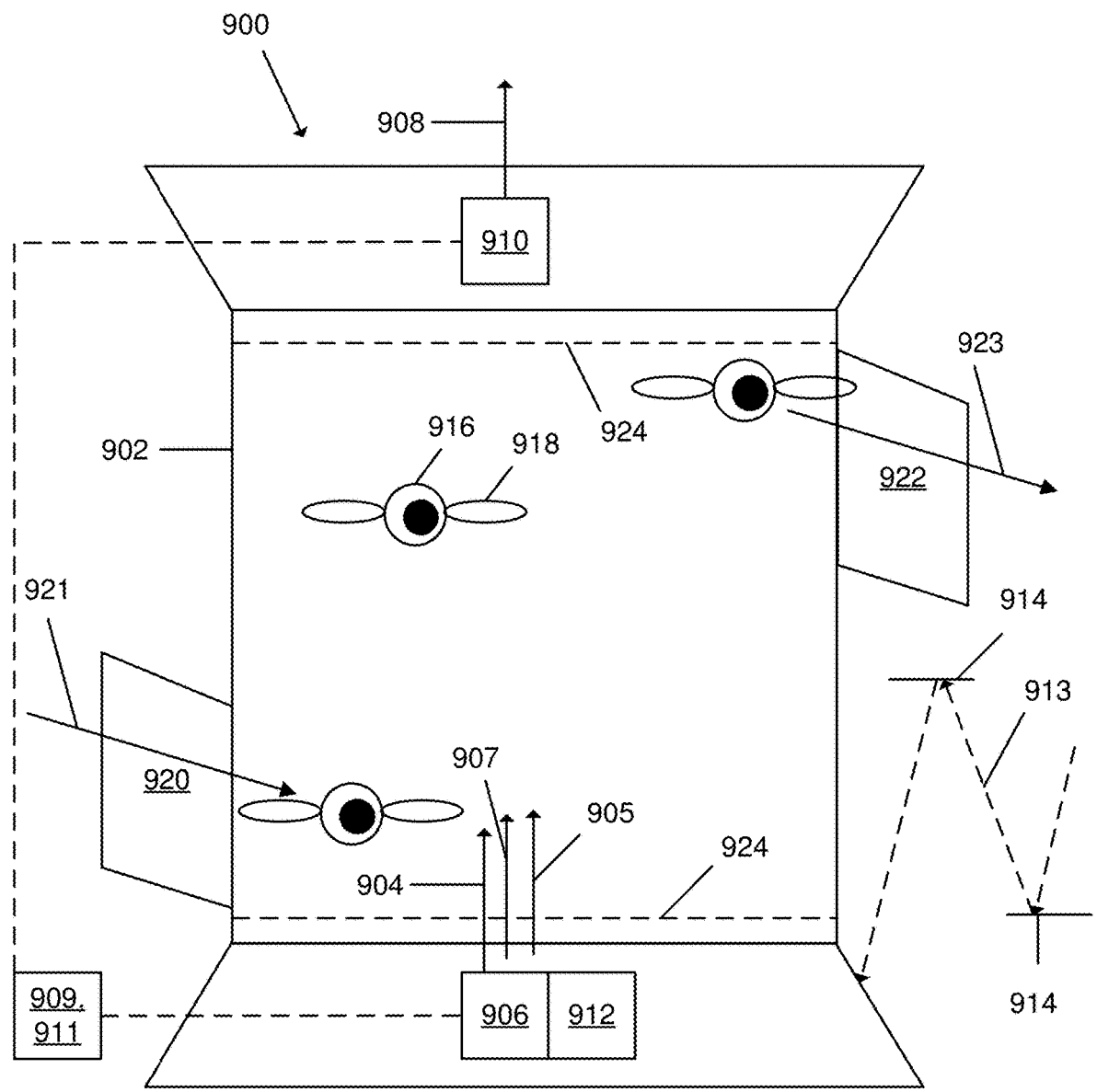
FIG. 9 is a cross section of a second uplift system that uses aerodynamic bodies, soaring on vertical wind updrafts.

FIG. 9 depicts one embodiment of the second uplift system 900, Uplift-2, for part-2. The uplift system 900 comprises a vertical wind tunnel 902. Vertical updraft is embodied either as rising hot air column, or as artificial wind. Vertical updraft of air is driven by an air pump 906 or by hot air in the direction of arrow 904. The updraft carries aerodynamic bodies 916 to a higher elevation. Air may also be pumped into the bottom of the vertical wind tunnel 902. Additionally, an air pump 910 at the top of the vertical wind tunnel 902 can be used to move air in the direction of arrow 908 and provide a stronger lift. The heating of that updraft air is provided by thermal energy from solar thermal radiation or by waste-heat. The air pumps 906, 910 may be electric air pumps powered by energy from power grid 909 or from renewable power, such as solar power 911. In one embodiment, an electric heater 912 pre-heats the air before the air is introduced to the air pump 906.

In one embodiment, solar radiation 913 is collected by one or more solar thermal collectors 914 (for example, sun-tracking heliostats and beam down collectors). The concentrated radiation is directed into the bottom of the vertical wind tunnel 902 and thereby heat the air within the vertical wind tunnel 902. The set up can be likened to a solar updraft tower, or a waste-heat updraft tower, to the extent that the updraft wind is used to uplift the aerodynamic bodies 916.

The uplift mechanism depicted in FIG. 9 is based on specialized aerodynamic bodies 916 getting elevated to higher elevations in the vertical wind tunnel 902, by performing soaring flights and riding thermals or wind updrafts provided by the vertical wind tunnel 902. The aerodynamic bodies 916 have wings 918 that may be, for example fluffy feather-like structures or aerodynamic wing-like structures, attached to the aerodynamic bodies 916. In one embodiment, the aerodynamic bodies 916 are structurally identical to balls 300 except for the addition of wings 918. An aerodynamic body releaser 920 is used to introduce the aerodynamic bodies 916 into the vertical wind tunnel 902 in the direction of arrow 921, and there is an aerodynamic body collector 922 that collects the aerodynamic bodies 916 near the top the vertical wind tunnel 902 for transport in direction 923 toward the upper storage reservoir 1100. Screens 924 are provided at the top and the bottom of the vertical wind tunnel 902 to help confine the floating aerodynamic bodies 916 to the vertical wind tunnel 902.

After accumulating in the aerodynamic body collector 922, the aerodynamic bodies 916 are packaged into containers with an automated packaging machine. The containers are transported to the upper storage reservoir 1100. These containers protect the structural integrity of the aerodynamic bodies 916. The containers pass through the drop-down system 1200 and into the power generation system 1400. Thereafter the descended containers accumulate in the lower storage reservoir 400. The containers in the lower storage reservoir 400 are separated from the balls 300 in the lower storage reservoir 400. Thereafter the aerodynamic bodies 916 can be removed from the containers for re-introduction into the vertical wind tunnel 902.

Figure 10:
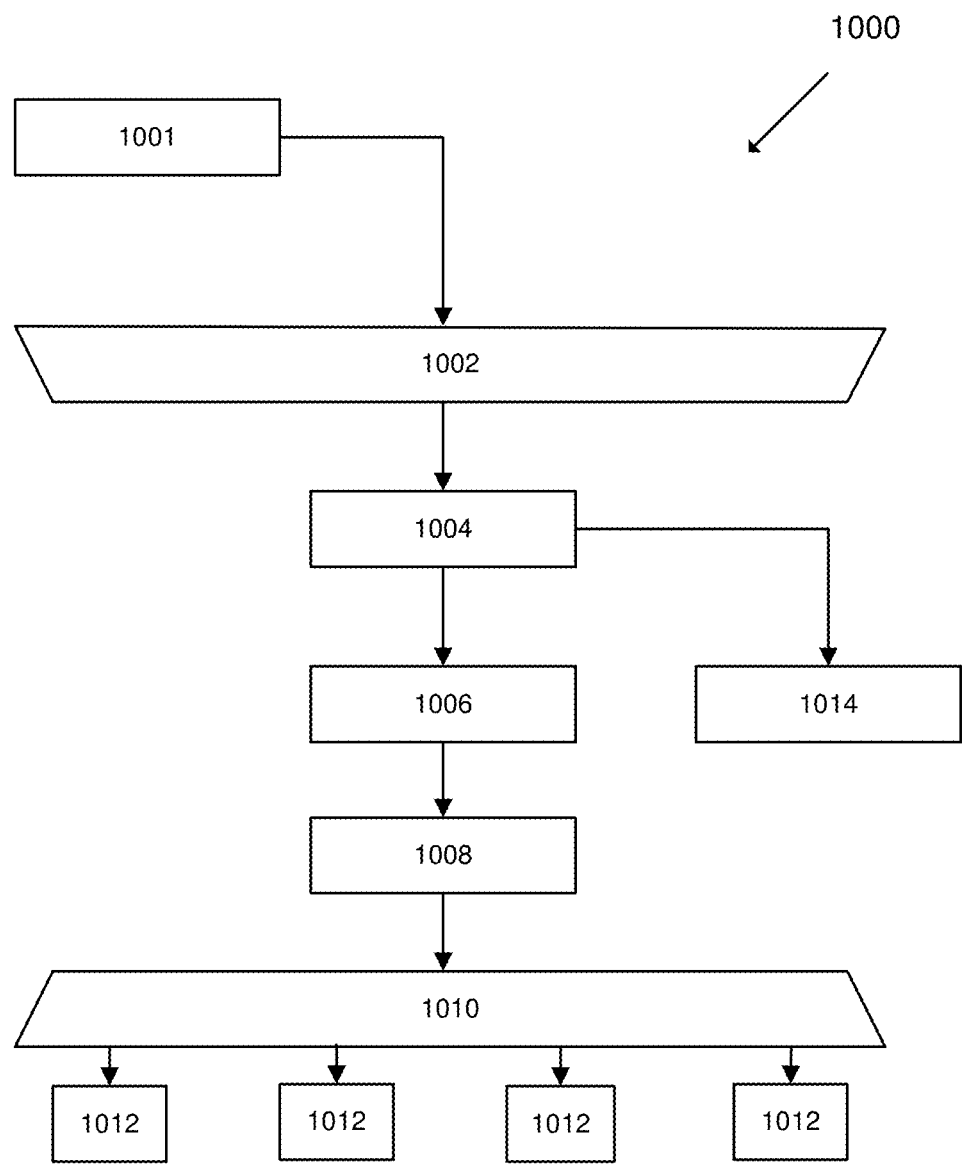
FIG. 10 is a schematic diagram of a third uplift system.

FIG. 10 depicts an embodiment that supports the third uplift system 1000, Uplift-3, that in turn supports part-3 of the gravity energy storage system. The third uplift system 1000 depends on the natural processes of water evaporation that enables water molecules to rise and eventually form rain clouds 1001 and ultimately precipitate as rainwater. To supplement the potential energy stored by the balls 300 in the upper storage reservoir 1100, the contents of the upper storage reservoir 1100 are augmented with packaged rainwater. This augmentation occurs by using the rainwater as the payload 314 in balls 300 (see FIG. 3). The third uplift system 1000, Uplift-3, comprises a tank 1002 that serves as a rainwater collector. In one embodiment, the tank 1002 is located near the top of the support 1202 and is at least 100 feet above the power generation system 1400. In another embodiment, the tank 1002 is between 100 feet and 500 feet above the power generation system 1400. In yet another embodiment, the tank 1002 is between 500 feet and 1,000 feet above the power generation system 1400. The flow of the collected rainwater controlled by an (ON/OFF) flow switch 1004 so that excess water can be disposed of via a runoff 1014 in case the storage capacity of the upper storage reservoir 1100 is full. In the rainwater processing-for-storage pathway, the next component is the bank of water filters 1006 that clean the collected rainwater. This is followed by a rainwater packager 1008 and rainwater distributor 1010 that divides the water into packaged portions 1012 (e.g. water sealed within watertight plastic bags or plastic bottles). The packaged portions 1012 are then placed in available slots in the uplift system 400 and thus are integrated into the upper storage reservoir 1100 within the balls 300.

In regions where snowstorms, sandstorms or dust storms are frequently, the sky high aerial rainwater collection and packaging system in part-3 of the facility is supplemented with a sky-high aerial snow or sand or dust collection system. The embodiment in such a case will be similar to that of the third uplift system 1000, except instead of rainwater, the working fluid collected and packaged will be snow, sand or dust.

Figure 11:
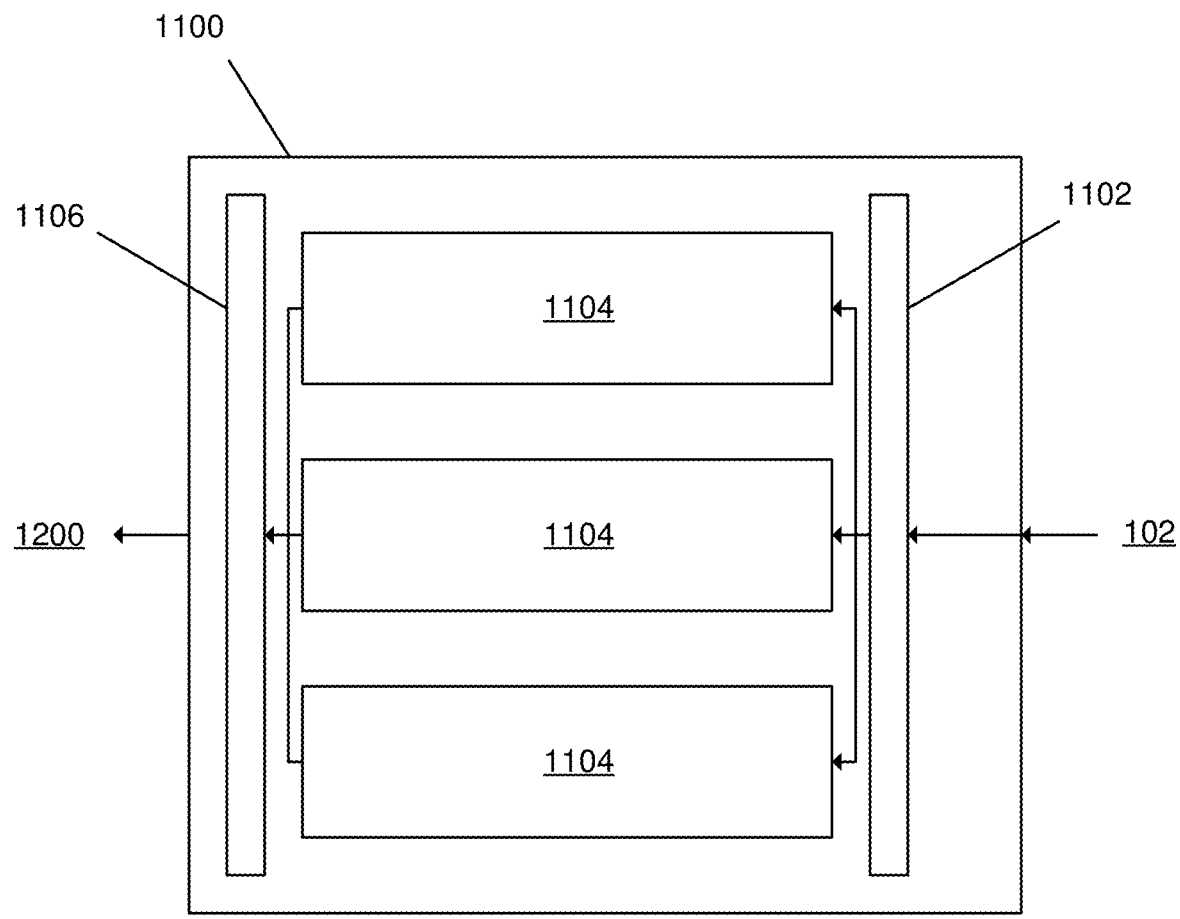
FIG. 11 is a schematic depiction of an upper storage reservoir.

FIG. 11 depicts the upper storage reservoir 1100. The upper storage reservoir 1100 comprises an intake manifold 1102, at least one upper storage container 1104, and an output manifold 1106. Bulk and packaged material transfer and transport structures, such as conduits connect these component subsystems to each other. For simplicity of illustration the conduits are depicted as thin lines to show fluid connections however, the conduits have a diameter sufficient to permit the balls 300 to pass. In one embodiment, the upper storage containers 1104 are large diameter HDPE pipes. In the embodiment of FIG. 11, the upper storage containers 1104 are constructed as modular tube storage containers for ease of storage management. In a large-scale embodiment, the upper storage containers 1104 have dimensions of, for example, 10 feet by 10 feet by 20 feet; or 10 feet by 10 feet by 40 feet or 10 feet by 10 feet by 50 feet, comparable to storage structures of cargo containers.

The lower storage reservoir 400 and the upper storage reservoir 1100 are separated by a reservoir elevation difference. Gravity-based power generation systems (and hence, energy storage) are based on the principle that these two reservoirs are located at different elevations, so that a significant difference in height can be established. In one embodiment, the elevation differences is in the range of 10 feet to 400 feet. The geographical (topographical) levels, locations and elevations that are used or suggested in the state of the art, can be used to classify the inter-level heights: space-borne level 2 (dA-3); space-borne level 1 (dA-2); above-ground, aerial (dA-1); land surface, on-the-ground (d0-0); underground level 1 (dB-1); underground level 2 (dB-2); sea platform surface, offshore platform (dS-1); sea surface, ocean surface, ship-at-Sea (dS-2); sea depth level 1 (dS-3); sea depth level 2 (dS-4); seabed, sea floor, ocean floor (dS-5).

Figure 12A:
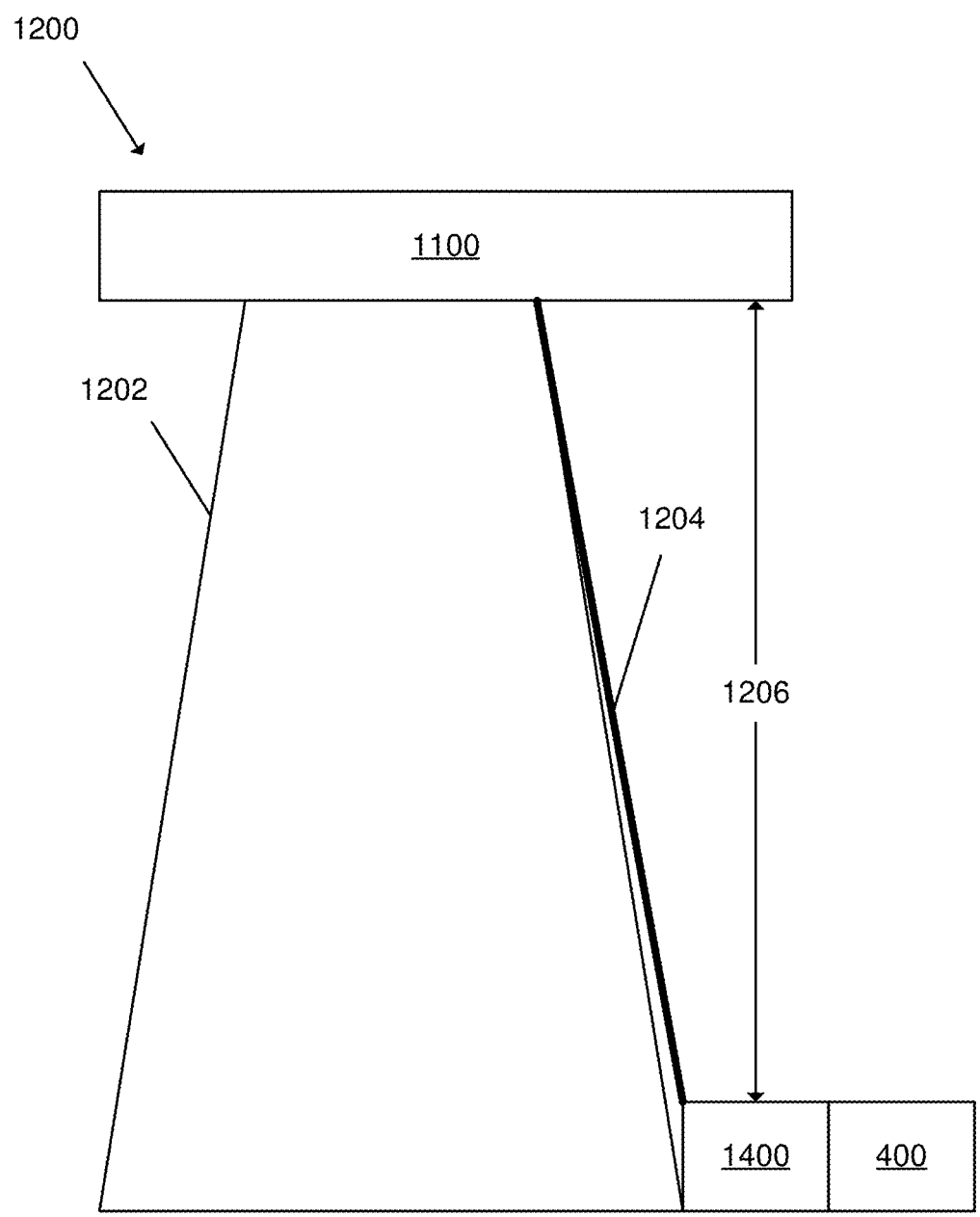
FIG. 12A is a cross section of a drop-down system and an upper storage reservoir on a support.

Referring to FIG. 12A, one embodiment of the drop-down system 1200 is shown wherein the drop-down system 1200 comprises a penstock 1204. The down-drop system 1200 can comprise covered chutes, tubes, or pipes. They can also be uncovered, open channels and tracks, such as tracks for luge sports, and skateboarding. The downfall does not have to be strictly vertical. It can be on a single inclined plane, or multiple, joined inclined planes, a kind of staircase of inclined planes, terrace landscapes, step pyramids or ziggurat with inclined steps, or ramps, instead of flat or horizontal steps. The downfall movement results in the conversion or transformation of the potential energy into kinetic energy, at some efficiency. A support 1202 (e.g. an artificial mountain) supports the upper storage reservoir 1100 and its contents. The upper storage reservoir 1100 is disposed proximate to the top end of the support 1202. The upper storage reservoir 1100 is separated from the power generation system 1400 by an elevation 1206. In one embodiment, the support 1202 is an architectural building structure with a mass at least double the mass of the upper storage reservoir 1100 at full capacity of balls 300.

In another embodiment, the drop-down system 1200 comprises inclines (e.g. inclined ramps or conduits) at a high enough angle up to the vertical so that the balls 300 do not linger at the points of collision contact with the walls of the inclines. Furthermore, the inside surfaces of the inclines can have embedded tessellations or tiling layers of patches of elastomeric material, from which the balls 300 can quickly bounce or rebound after a collision.

In one embodiment inner surfaces of the inclines of the drop-down system 1200, as well as containers/carts of packaged balls, and the balls 300 are all coated with substances capable of being repellent to water, oils and other liquids. This omniphobicity will reduce friction forces in wall-to-ball and ball-to-ball collision contacts. Nanostructured substrates that can be used to create self-healing, slippery liquid infused porous surfaces (SLIPS) materials is one suitable example that can be used to achieve the desired effect of omniphobicity.

In one embodiment, release of the balls 300 through the drop-down system 1200 occurs in intervals such that no two balls with contact one another during their passage through the drop-down system 1200.

Figure 12B:
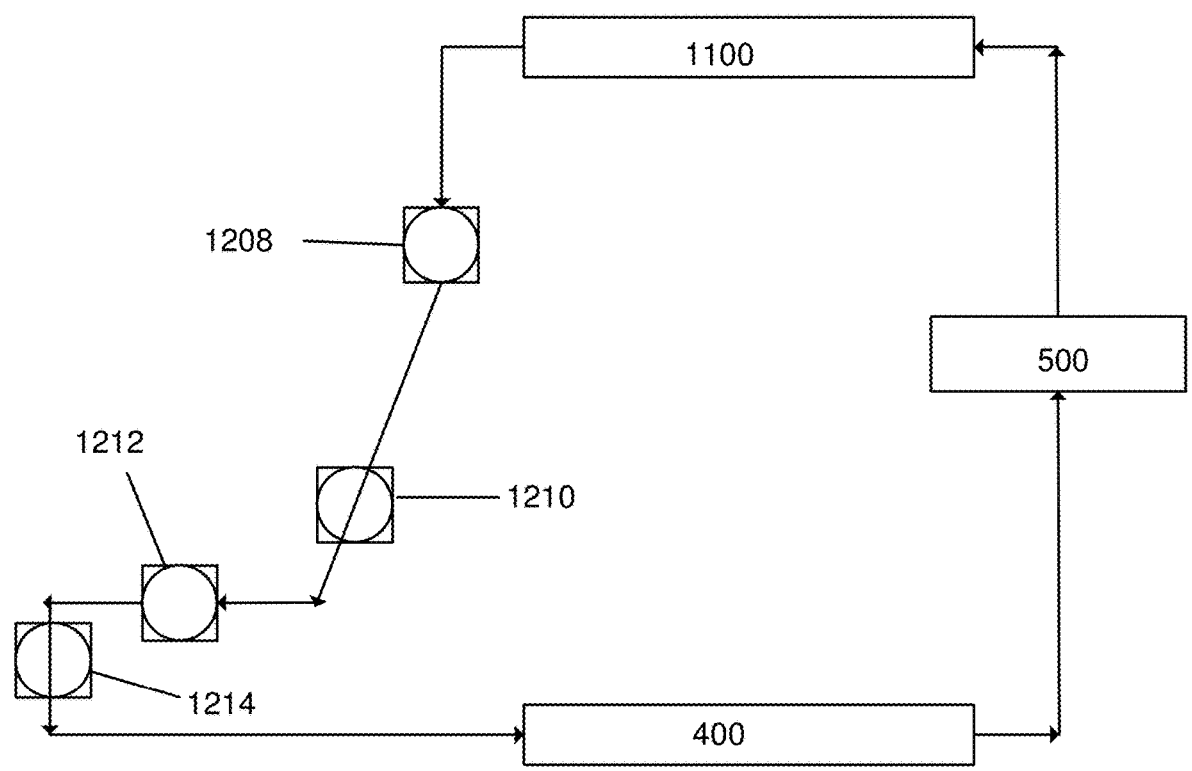
FIG. 12B is a schematic depiction of another drop-down system.

Referring to FIG. 12B, in one embodiment, the down-drop system 1200 is divided into four sections): a vertical drop section 1208, inclined slope section 1210, almost flat runway section 1212, and residual drop section 1214. On release from the upper storage reservoir 1100, a ball 300 executes a sheer drop in the vertical drop section 1208, in order to quickly gain kinetic energy. The dropping ball 300 then lands on the inclined slope section 1210, where conversion from kinetic energy into electric power mainly occurs. This energy conversion is discussed elsewhere in this specification. See FIG. 12C and FIG. 12D. The dropping ball 300 then enters the almost flat runway section 1212 (gradient below 5%), where there is additional conversion of the kinetic energy into electrical energy. The ball 300 then enters the residual drop section 1214, where it is directed into the lower storage reservoir 400. In one embodiment, the vertical drop section 1208 comprises rollers with motor-generators in the vertical surface for additional electric power generation.

The drop-down system 1200 includes, in one embodiment, transportation carts that travel downhill through the penstock (e.g. on rails or other constrained track such as an enclosed tube or open trench). In one embodiment, multiple balls 300 accumulate in a sled cart or wheeled cart near the upper storage reservoir 1100 until a predetermined mass of balls 300 accumulates. The wheeled carts have hub motor-generators embedded in their wheels to generate electric power as they convey the balls 300 to the power generation system 1400. The generated energy is stored in onboard energy storage systems on the cart, with one embodiment using battery energy storage, or a super-capacitor or flywheels. In one embodiment, multiple balls 300 are packaged into pods during their trip through the drop-down system 1200.

Figure 12C:
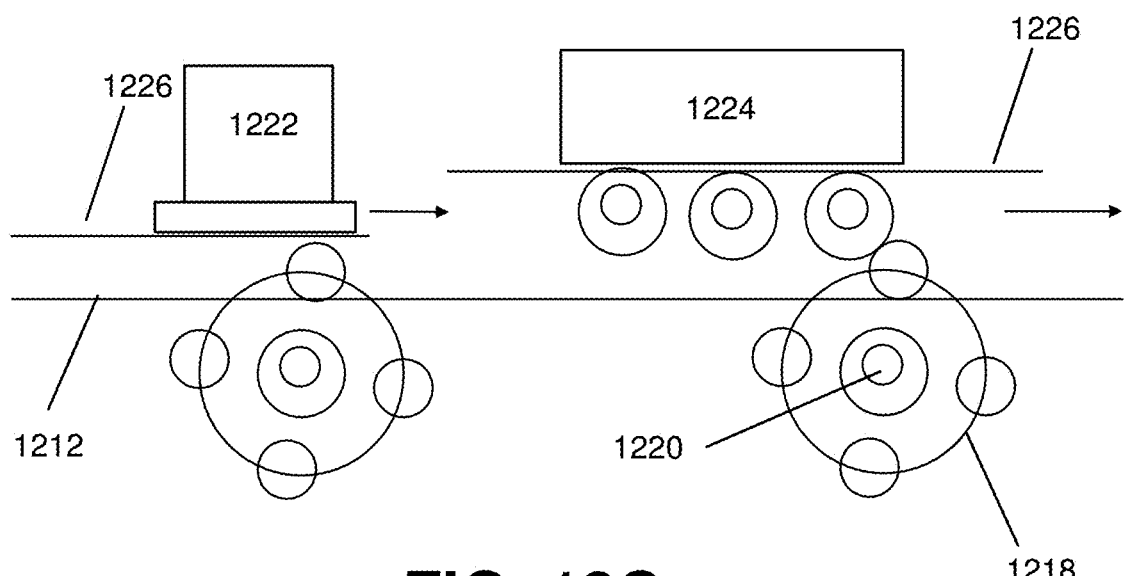
FIG. 12C is a schematic depiction of a cart moving along an almost flat runway section.
Figure 12D:
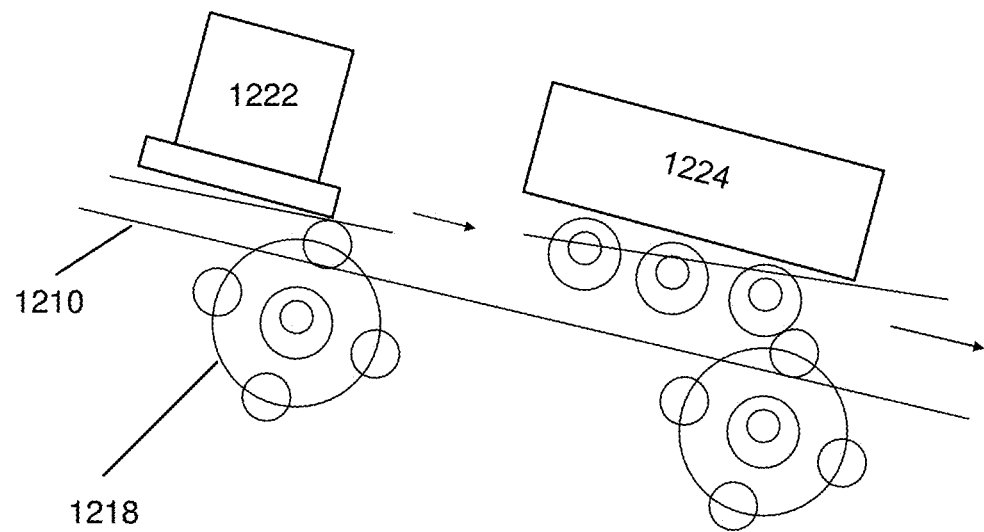
FIG. 12D is a schematic depiction of a cart moving along an inclined slope section.

Referring to FIG. 12C and FIG. 12D, the surfaces of the inclined slope section 1210 and the almost flat runway section 1212 are configured to have rollers 1218 embedded in their exposed surfaces. The rollers 1218, in turn, incorporate hub motor-generators 1220, which are operated in the generator mode, in order to produce electricity. The sled carts 1222 and/or wheeled carts 1224 are confined in their tracks using a guide cable 1226. The individual electric currents of the rollers 1218 are integrated using a Balance of System subsystem, (not shown).

Packet gravity energy storage power generation involves mechanical motions (lots of moving parts in the down drop phase). The mechanical operation involves friction that, in turn, results in vibration motions, which in turn produce heat as well as noise and sound. The mechanical effects can be mitigated by using wheels and tires encased in foam or airbags or inflatable tubes.

Figure 12E:
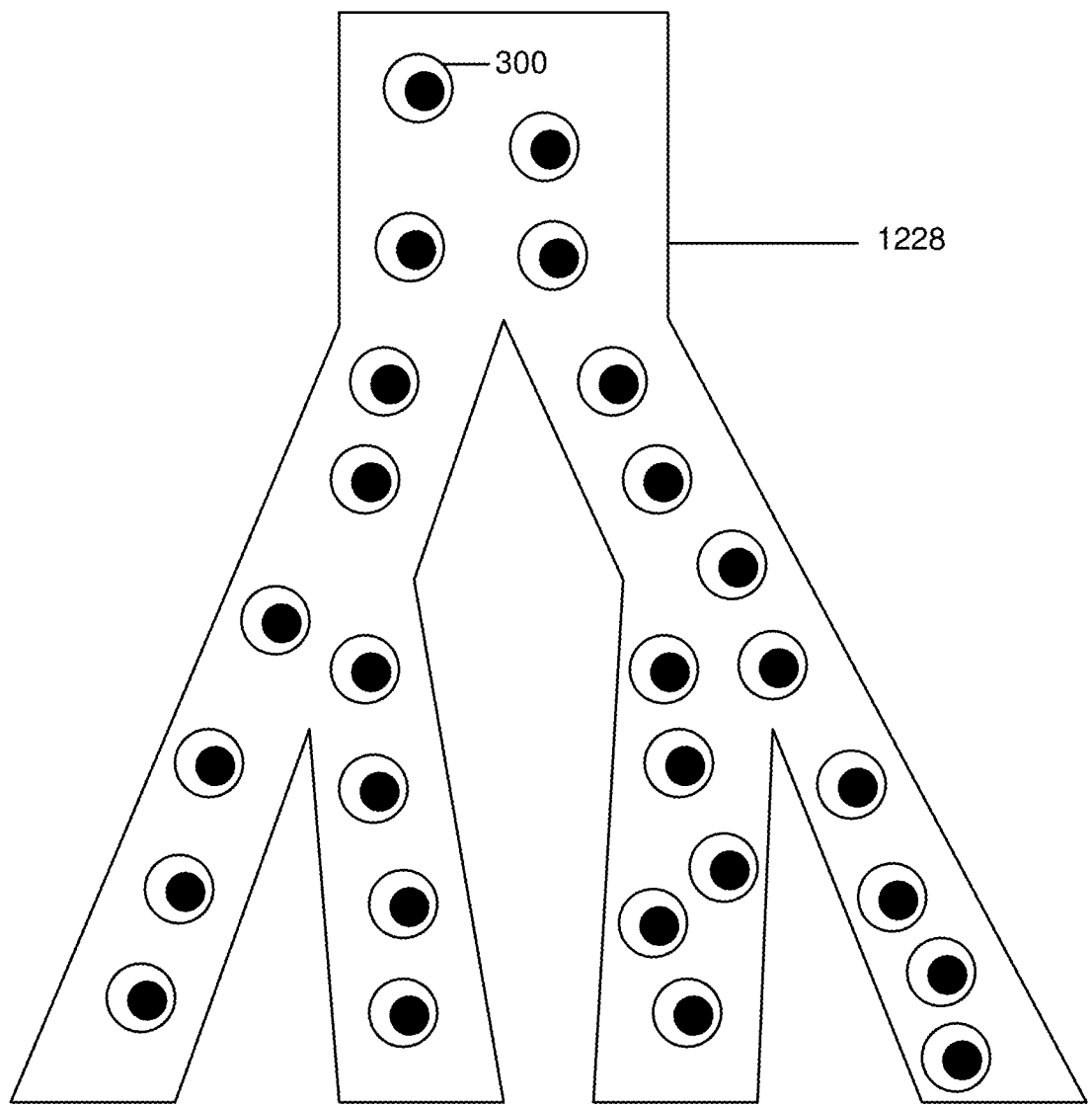
FIG. 12E depicts a drop-down system with branched slides.

Referring to FIG. 12E, in one embodiment, the drop-down system 1200 interacts with the power generation system 1400 via a flow chute distribution system. In the embodiment depicted in FIG. 12E, the flow chute distribution system is a series of branched slides 1228 configured similar to grain chutes to handle grain distribution. The branched slides 1228 permit balls 300 to be delivered to multiple turbines in power generation system(s) 1400.

Figure 13:
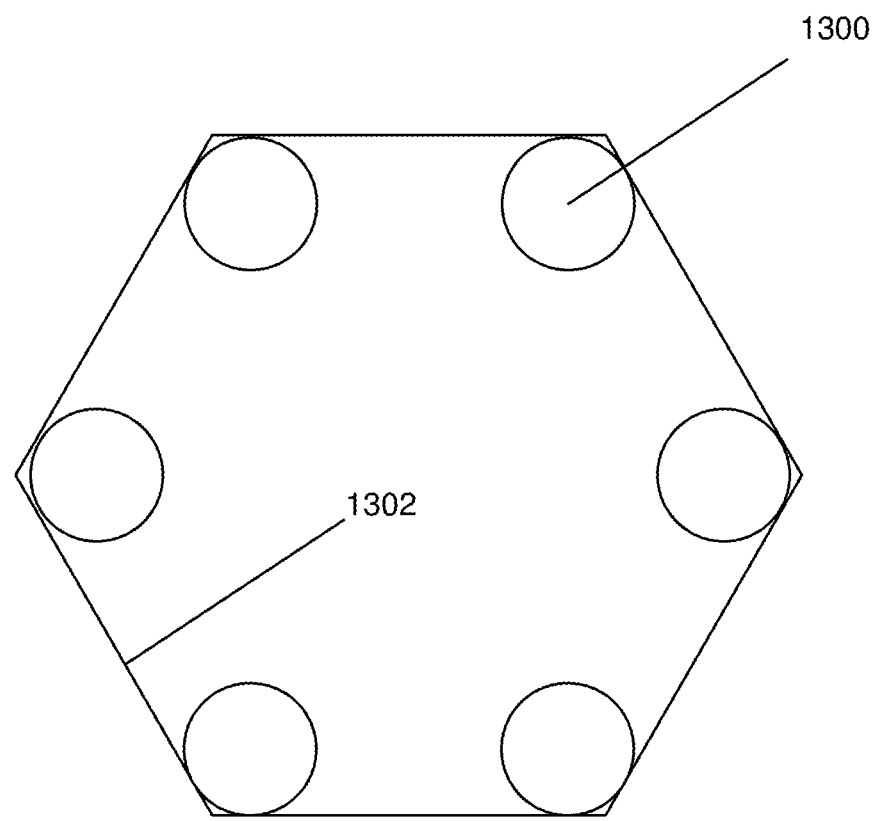
FIG. 13 is a plan view of the support.

Referring again to FIG. 12A, the system is disposed on the support 1202. In one embodiment the support 1202 is built as roof-room-pillar structures, a top plan view of which is provided in FIG. 13. A plurality of pillars 1300 is formed of a suitable material such scaffolding building blocks, steel rods, reinforced concrete, wood and bamboo. The outside material of the support 1202 forms the sides/roof 1302. The outside material may be formed of similar material. In another embodiment cargo containers are used as the building blocks of the support 1202. In one embodiment, the elevation 1206 is between 100 feet and 500 feet. In another embodiment, the elevation 1206 is between 100 feet and 1,000 feet.

The support 1202 can be visualized as supporting the upper storage reservoir as a cargo container ship in-the-sky, cruise ship in-the-sky, and also as an aerial and elevated forms, such as sky burial, sky tomb pyramid, pagoda, or inverted dome or inverted stupa, elevated ziggaraut, elevated temple architecture, elevated landscape terrace, aerial ark, aerial carrier, aerial submarine. The support 1202 can also be visualized as an artificial cliff, artificial ridge, or artificial shelf. The artificial mountain support, together with the upper storage reservoir 1100 functions as a de facto energy pyramid.

The upper storage reservoir 1100 is separated from the power generation system 1400 by an elevation 1206. The support 1202 is an architectural building structure with a mass at least double the mass of the upper storage reservoir 1100 at full capacity of balls 300. In one embodiment the support 1202 is built as roof-room-pillar structures, a to plan view of which is provided in FIG. 13. A plurality of pillars 1300 formed of a suitable material such as steel rods, reinforced concrete, wood and other similar materials. The outside material of the support 1202 forms the roof 1302. The outside material may be formed of similar material. In another embodiment cargo containers are used as the building blocks of the support 1202.

Figure 14:
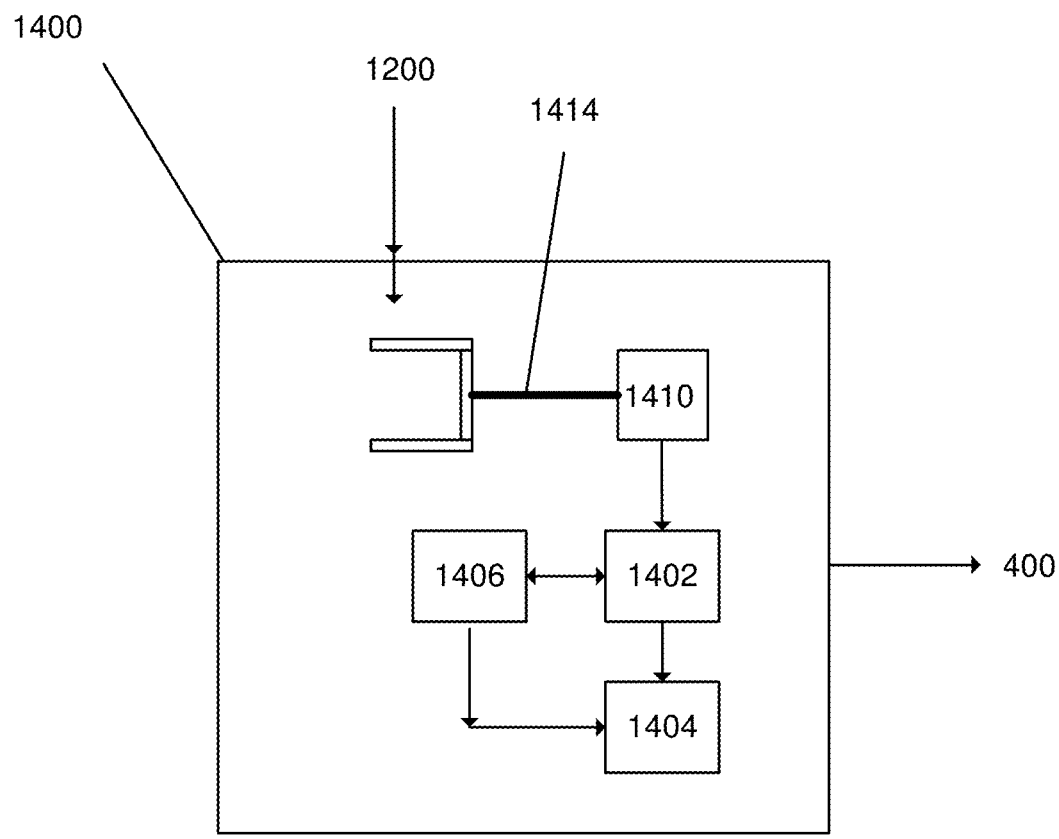
FIG. 14 is a schematic depiction of a power generation system.

FIG. 14 depicts one embodiment of the power generation system 1400 that comprises a turbine 1410, an electricity generator and auxiliary control system 1402, a transmission and distribution connection system 1404, and an energy storage system 1406. The electrical energy generated by the power generation system 1400 may be routed off site to provide electrical power to remote locations. As described in detail elsewhere in this specification, in one embodiment, the turbine 1410 is a modified variation of a conventional (water-based) hydro-electric turbine. The turbine 1410 is capable of handling the foot to yard scale granular balls, instead of the sub-nanoscale of water molecules. In one embodiment, the turbine 1410 is an impulse turbine, such as a stubbed Pelton turbine, instead of a reaction turbine, such as a Francis turbine or a Kaplan turbine. This choice is aligned with the goal of minimizing the amount of contact between the balls 300 and the inside surfaces of the turbine 1410. One modification is the addition of an impact wheel 1502 (see FIG. 15) which is attached by a shaft 1414 to a turbine 1410. The shaft 1414 may be a single straight shaft or multiple shaft rods which are not collinear but are linked by a gear system. In one embodiment, the kinetic energy is converted directly into electric power, bypassing a turbine system.

Figure 15:
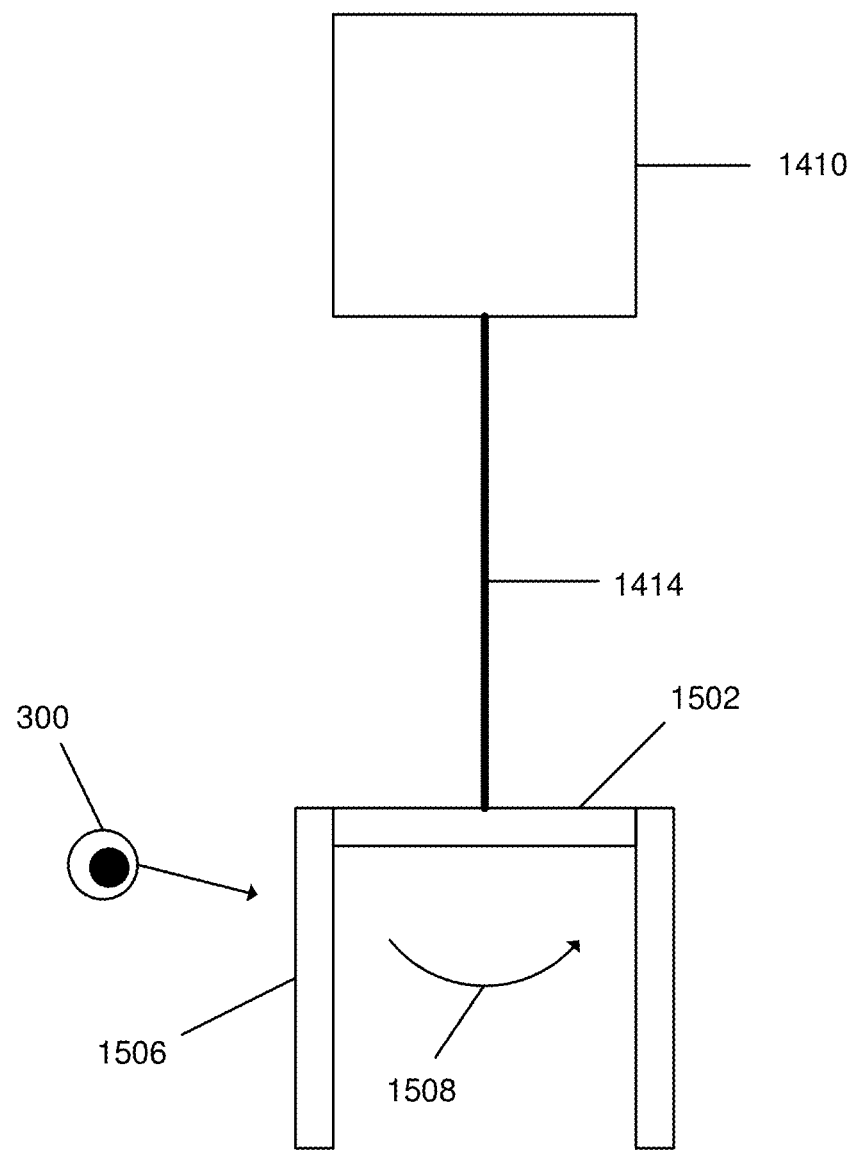
FIG. 15 depicts a turbine.

FIG. 15 depicts the turbine 1410 in detail. The turbine 1410 comprises the shaft 1414 that connects to an impact wheel 1502. The turbine 1410 is similar to a conventional Pelton turbine except in that the Peltonn buckets have been reduced to stubs or eliminated entirely. Balls 300 impact blades 1506 which rotate the impact wheel 1502 in the direction of arrow 1508. The shaft 1414 transfers the rotating force from the impact wheel 1502 to the turbine 1410. The blades 1506 are the only components of the turbine 1410 that have direct contact with the balls 300.

Figure 16:
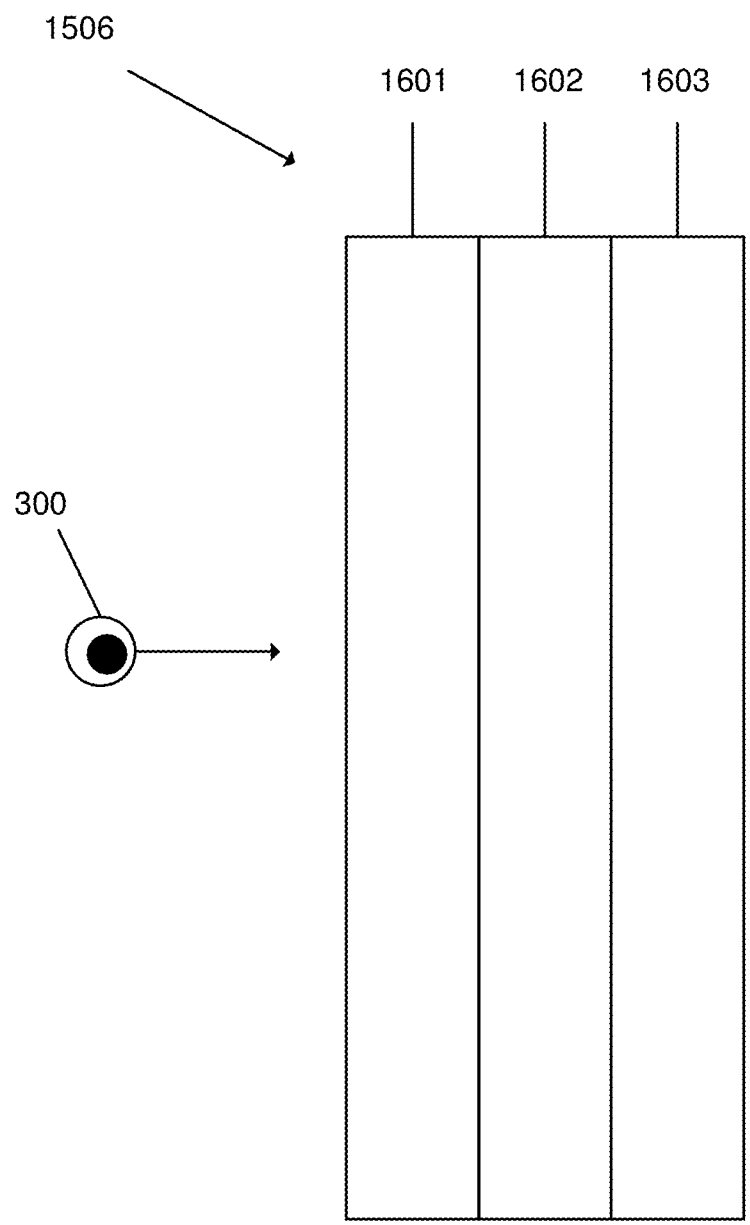
FIG. 16 is a cross section of blades for use with the turbine.

Referring to FIG. 16, each blade 1506 has three layers. A first layer 1601 that is present is the outermost layer and is directly impacted by the balls 300. The first layer 1601 comprises a rubber material, such as natural rubber and synthetic rubber. The first layer 1601 is capable of reversible compression deformations similar to those of drum surfaces. In one embodiment, the first layer 1601 has a grooved surface with high values of angle of repose, so that an impacting ball 300 lingers temporarily on the blade 1506 in order to impart its kinetic energy but then, the ball 300 quickly rolls off. The blade 1506 can also be covered with a removable sleeve whose degree of functional slipperiness can be customized by selection of the material. A second layer 1602 is sandwiched between the first layer 1601 and a third layer 1603. In one embodiment, the second layer 1602 comprises a viscoelastic polymer or polymeric composites, such as the thermoset, polyether-based, polyurethane sold under the brand name SORBOTHANE (R), butyl rubber or neoprene. The second layer 1602 acts as a shock absorber. The third layer 1603 is a solid layer of high impact resistant materials, including metal, wood, high impact resistance composites; high density polymers, including ultrahigh molecular weight (UHMW) polyethylene, high impact resistance polymers, including polycarbonate, high impact polystyrene (HIPS).

Figure 17:
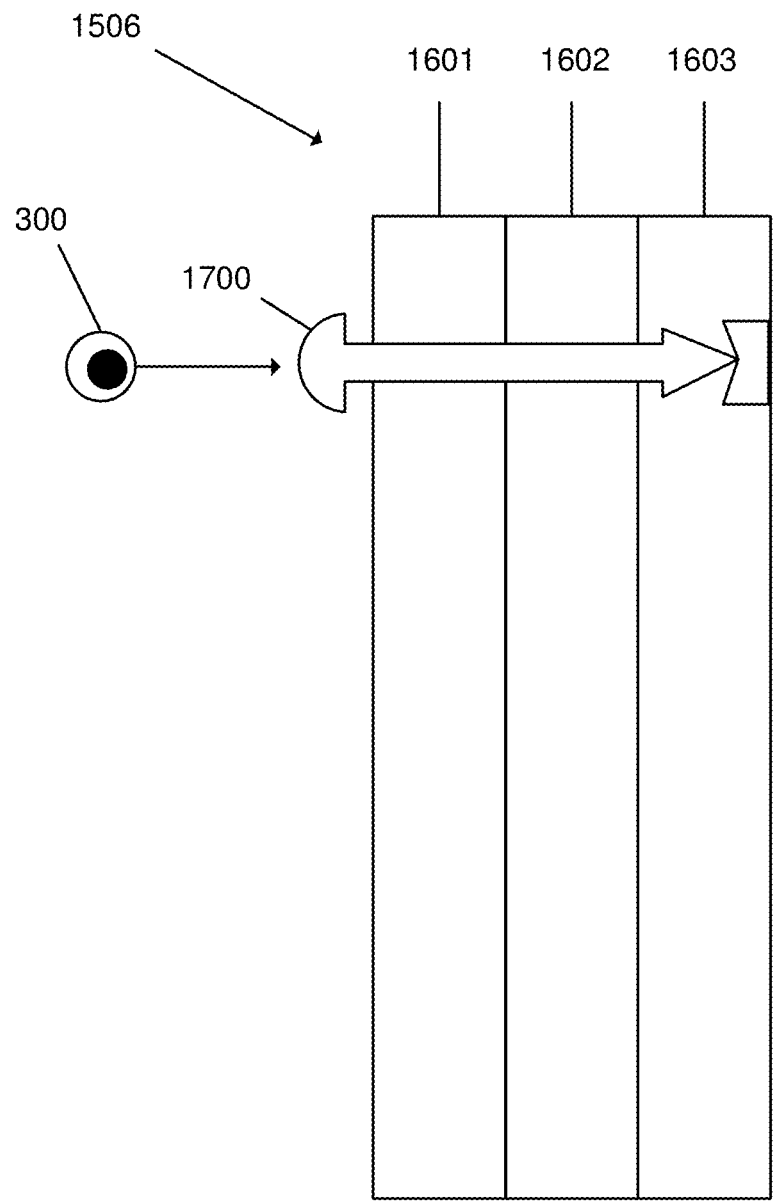
FIG. 17 depicts a stud for use with the blades.

FIG. 17 depicts another embodiment of the blade 1506 wherein studs 1700 are imbedded in the blade 1506. The studs 1700 transmit kinetic energy from the impacting ball 300 to the third layer 1603. The studs 1700 may be, for example, metal shafts that extend through the first layer 1601, through the second layer 1602 and partially through the third layer 1603.

Figure 18:
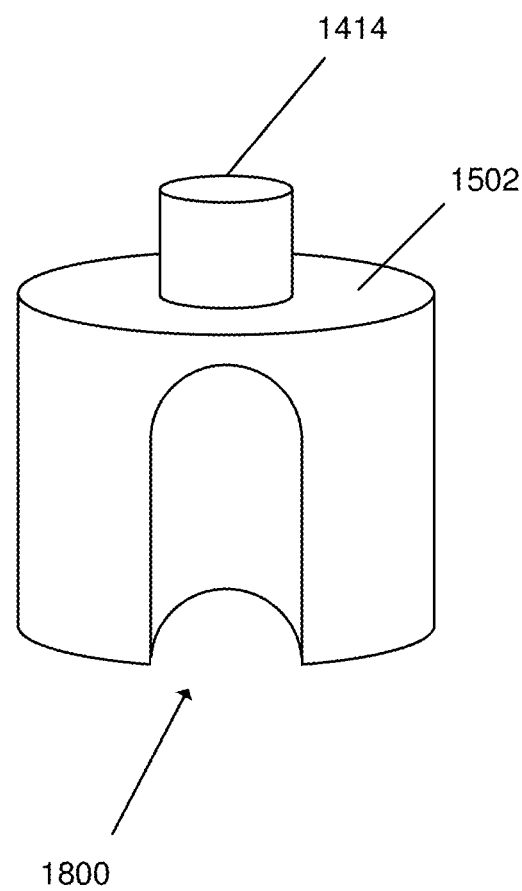
FIG. 18 illustrates a Savonius blade.

FIG. 18 depicts another embodiment of the blade 1506 wherein a Savonius blade 1800 is utilized. In this case, multiple streams of balls 300 can be directed simultaneously at a Savonius blade 1800. Although FIG. 18 shows a single Savonius blade 1800 for simplicity of illustration, multiple Savonius blades 1800 can be implemented for each impact wheel 1502. Also, the Savonius blades 1800 may have helical twists, with the turbine becoming structured as a helical turbine to form a Savonius-Gorlov-Rosefsky Hydrocoil helical hybrid blade.

In order to minimize the direct contact of the impact wheel 1502 the shaft 1414 may be mounted as a vertical shaft, leading to a configuration that is a vertical axis, horizontal wheel turbine. This configuration has the advantage that ballistic launch nozzles can be arranged around the impact wheel 1502, to simultaneously impinge their streams of balls on multiple Savonius blades 1800 to drive the rotation of the impact wheel 1502. The speed of rotation of the impact wheel 1502 can thus be adjusted in the field by altering the number of jet streams active at any time.

In another embodiment, the blades 1506 are shaped like the blades of truck based snow plows, that like half or quarter hollow cylinders. These blades are disposed horizontally along the rim of the impact wheel 1502 with the same axial orientation as the shaft 1414 and clearing the width of the rim of the impact wheel 1502. In this case, the overall turbine can be configured as a horizontal axis, vertical wheel turbine. Thus, the impinging jets streams can be operated in overshot, undershot, breast shot and backshot modes.

Figure 19:
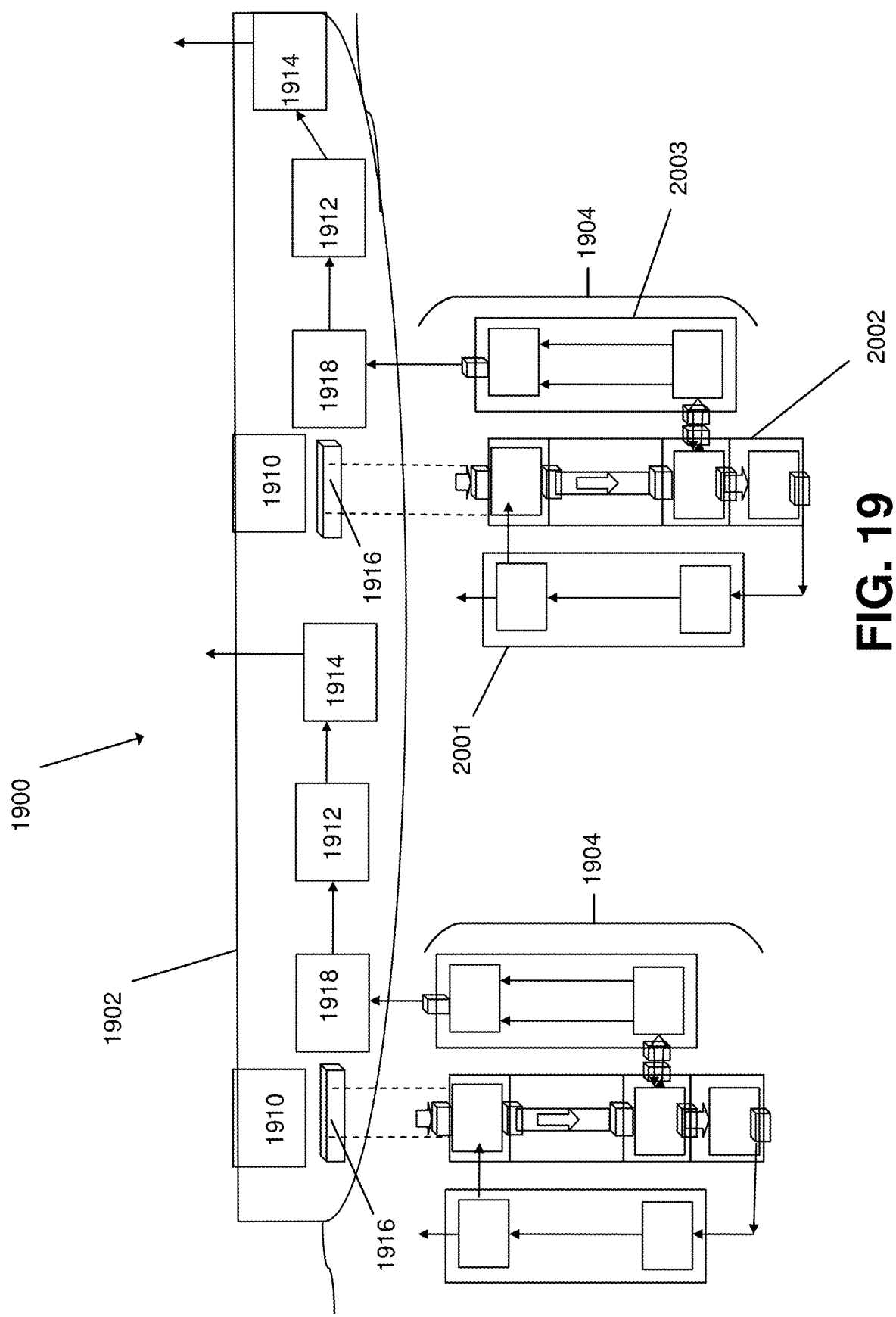
FIG. 19 depicts a submersible hydroelectric power facility.

Referring to FIG. 19 a facility 1900 for power generation using a submersible, hydroelectric, modular power facility 1904 is shown. The facility 1900 has a sea surface platform 1902 that has an upper storage reservoir 1910, a power transmission terminal station 1918 to receive power generated under the sea; an energy storage facility 1912 and an interface facility 1914 for offshore-to-land energy transmission. The platform 1902 includes a lift 1916, such as a wire cabling and elevator, that raises and lowers one or more components of the modular power facility 1904. In one embodiment, the shipboard energy storage facility 1912 is based on battery technology (zinc-oxide, lead-acid, Lithium-ion), or on flywheels, or other means of utility scale electricity storage. On board the platform 1902 there can be energy utilization facilities, that use some or all of the harvested energy, for manufacturing of articles and commodities, generation and storage of hydrogen, manufacture of fuel cells, carbon capture and conversion. The interface facility 1914 can transmit electricity to land using high-voltage direct current equipment.

The remote platform 1902 may be on a floating vessel, such as a mothership, or may be a stationary platform such as the kind used for oil rigs. Inspection visits by human operators is possible. Examples of suitable platforms include re-purposed offshore oil rig or platform, refurbished oil tanker or supertanker, where the toxic materials of earlier use are coated over, instead of being cleaned out to reduce expenses, refurbished and re-purposed cargo container carriers and super-carriers, a purpose-built ship that is customized for use in the disclosed process, a floating platform for offshore solar power electricity generation, a floating platform for offshore wind power electricity generation, a submersible support facility, a re-configurable basic submersible vessel (see FIG. 21), a submersible tug-sub robot.

In the embodiment of FIG. 19, two modular power facilities 1904 are depicted that are duplicates of one another. In other embodiments one modular power facility 1904 is present. In other embodiments, three or more modular power facilities 1904 are present. Each modular power facility 1904 comprises a first module 2001, a second module 2002 and a third module 2003.

Figure 20:
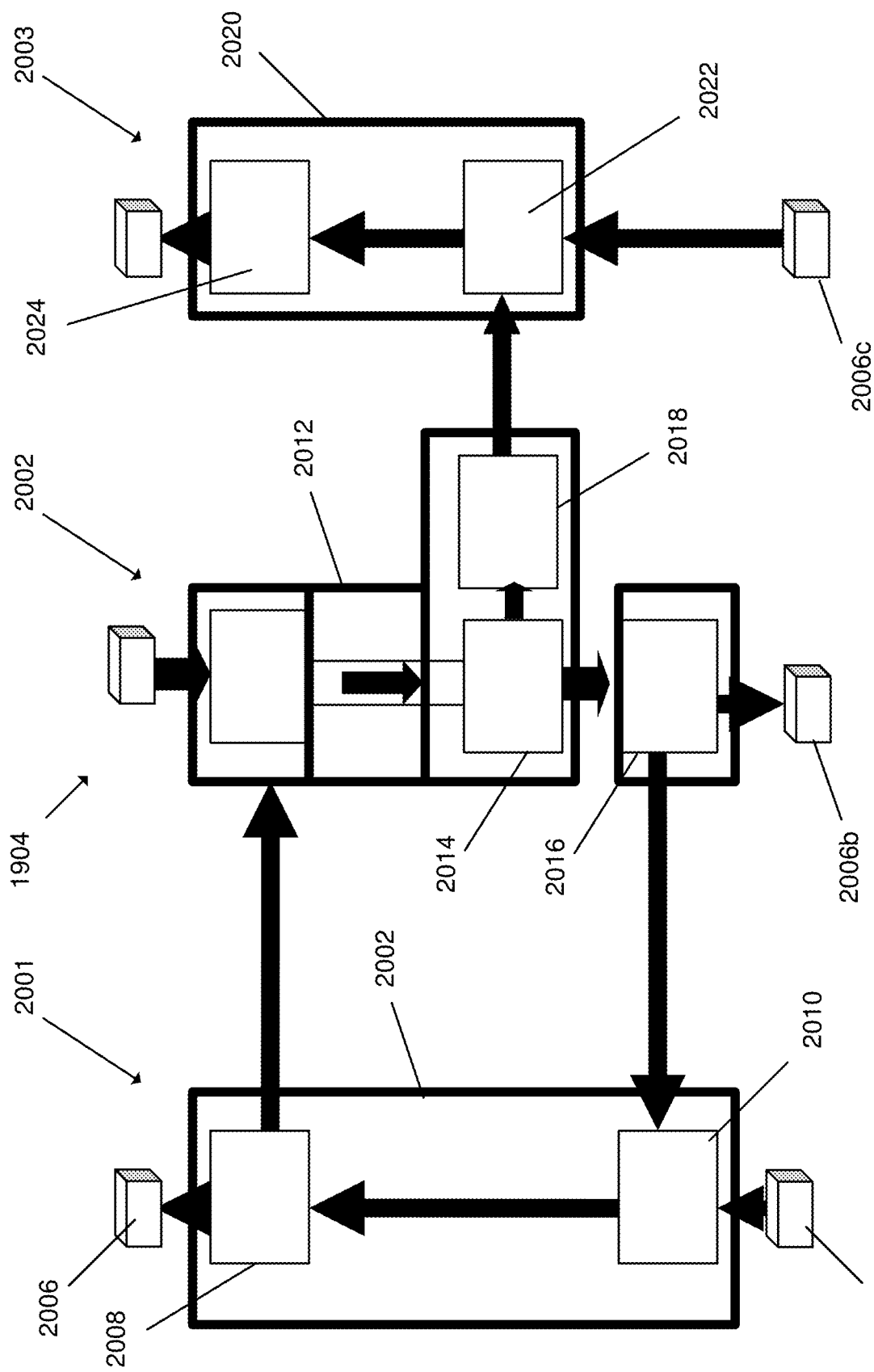
FIG. 20 is a cross section of a module for use in the submersible hydroelectric power facility.

Referring to the embodiment of FIG. 20, the first module 2001, a second module 2002 and a third module 2003 are separate, encapsulated modules that are interconnected using submersible adapters 2006.

The first module 2001 is enclosed within a waterproof housing 2002 that encapsulates a feeder 2008 and an uplift system 2010. Additionally the interlock adaptor 2006*a* can be used to connect the first modules 2001 in series (see FIG. 22). The uplift system 2010 is similar to the first uplift system 500. The uplift system 2010 can be any embodiment of an uplift system for the first part that is presented in this disclosure. The feeder is a connection to the upper storage reservoir 1910.

The second module 2002 is enclosed within a waterproof housing 2012 and comprises a drop-down system 2012 (akin to drop-system system 1200) that provides balls 300 (not shown) to power generation system 2014 (akin to power generation system 1400) that includes a turbine 2018. Balls 300 are then passed to the lower storage reservoir 2016 (akin to lower storage reservoir 400). In some embodiments, an adaptor 2006*b* is present for connecting the second module 2002 in series (see FIG. 22).

The third module 2003 is enclosed within a waterproof housing 2020 and encapsulates a power receiver 2022 and a power transmitter 2024 which are endpoints for power transfer, and are part of the power balance system. The modules 2001, 2002 and 2003 are positioned using submersible, underwater tug-sub robots (submersibles acting as tugs and ferries). The path traveled by the balls 300 has been evacuated of water. In some embodiments, an adaptor 2006c is present for connecting the third module 2003 in series (see FIG. 22). In another embodiment, the first, second and third modules 2001, 2002 and 2003 are enclosed within a single waterproof housing rather than in separate waterproof housings.

Figure 21:
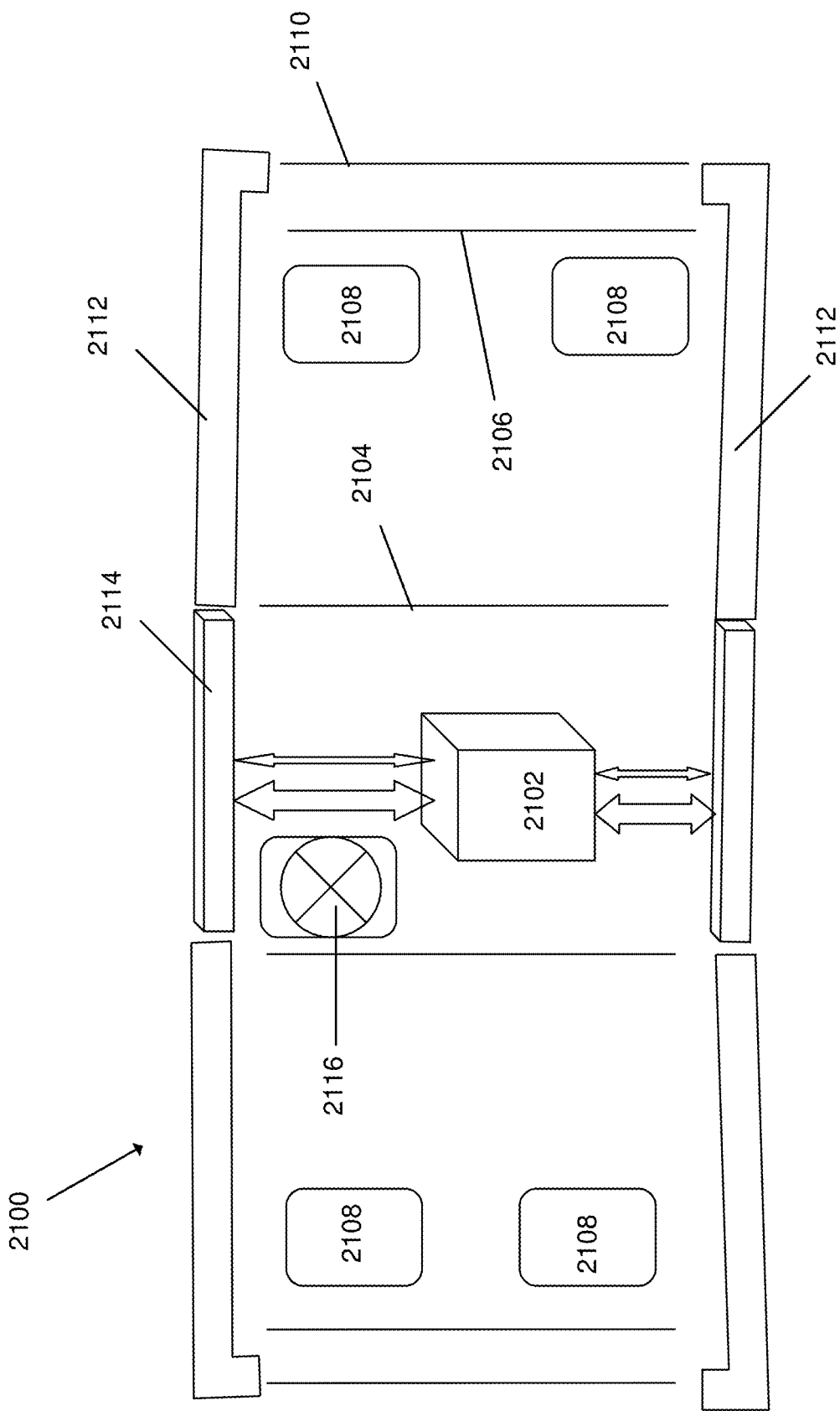
FIG. 21 shows a reconfigurable basic submersible vessel.

Referring to FIG. 21, a re-configurable basic submersible vessel 2100 is schematically depicted. The vessel 2100 is used to enclose modules such as modules 2001, 2002 and 2003 to ensure that each component becomes waterproof and hydrostatic pressure-resistant.

The vessel 2100 comprises a payload container space 2102 with payload (not shown), a container shell wall 2104, a pressure hull 2106, ballast tanks and trimming tanks 2108, an exoshell 2110, end-caps 2112, a payload lid 2114 and a propulsion plant 2116. In one embodiment, the pressure hull 2106 of the vessel 2100 is constructed using acrylic plastics or related composites, as hull materials. The current state of the art is that acrylic plastics based whole pressure hulls, for submersibles, are capable of hydrostatic pressure resistance to water depths of 3280.84 ft (1000 m).

Submersible tug-sub robots are used as auxiliary support systems for handling (e.g. (deployment, installation, replacement, disassembly, etc.) modules such as modules 2001, 2002 and 2003. For example, the tug-subs provide the compressed air resources used to regulate the buoyancy of the modules. The shelled modules are positioned and assembled using submersible, underwater tug-sub robots. To sink a module to a specified depth or to re-surface it, a submersible tug-sub is temporarily attached to it as a ferry, the buoyancy of the adjusted as needed.

Figure 22:
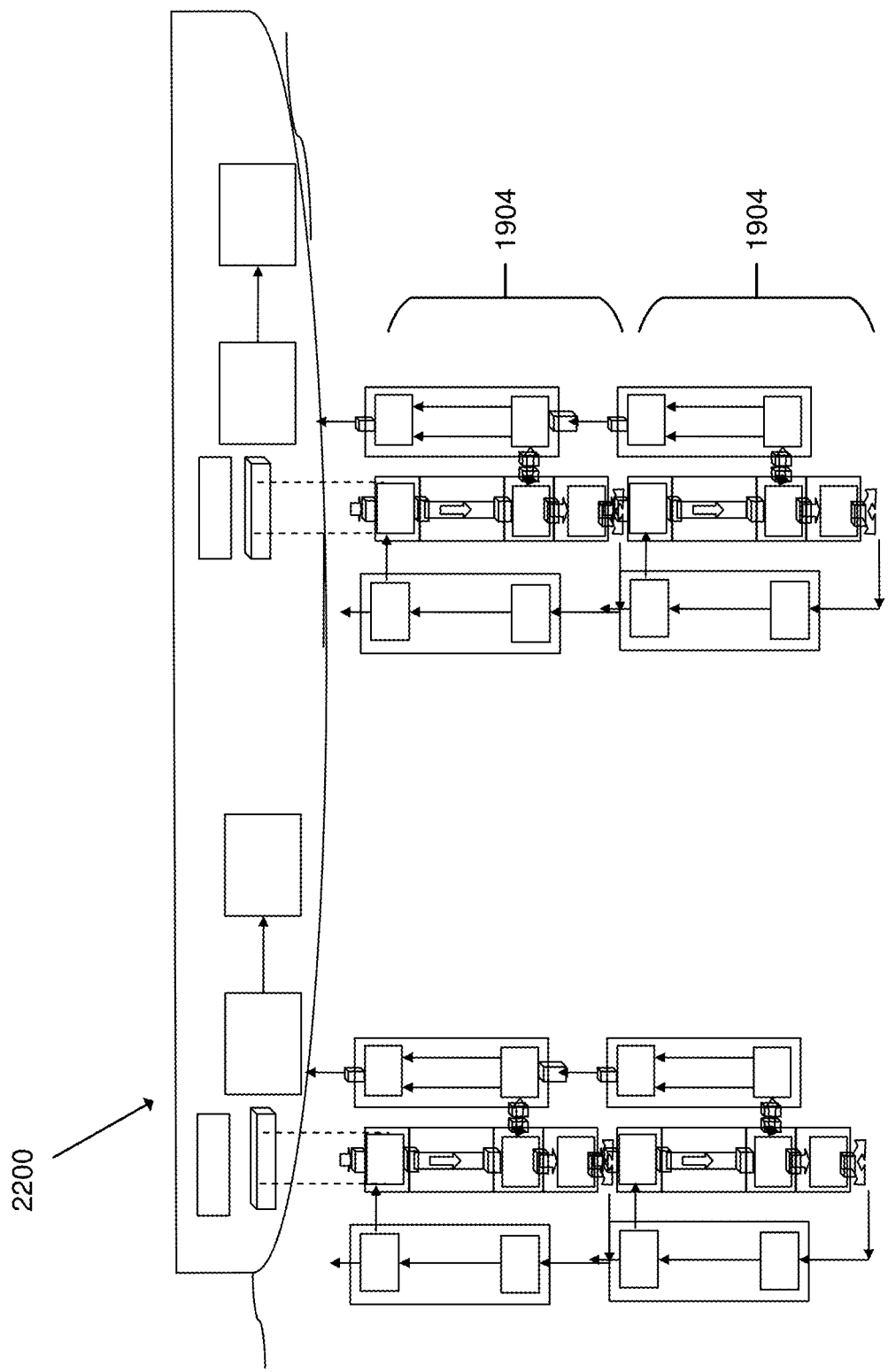
FIG. 22 illustrates a cascaded array with multiple assemblage structure that are arranged in series.

Referring to FIG. 22, a cascaded array 2200 is depicted. The cascaded array 2200 comprises multiple assemblage structure 1904 that are arranged in series such that balls 300 exiting from a first assemblage structure provide input to a second assemblage structure.

One major advantage provided by the disclosed system is that the head (elevation, meters) and flow (cubic meters per second) characteristics installation become flexible or even real-time re-programmable. For example, one can adjust the elevation by operation of the lift 1916. Another advantage is that arrays of modules can be used to scale up and comprehensively exploit the hydro-power potential of a site or water resource.

One very important advantage of the use of the balls 300 is that the surrounding sea and ocean is not changed chemically or thermally. The platforms 1902 are self-contained, closed systems, much like biological organisms.

The disclosed systems provide numerous advantages over conventional systems. The disclosed systems are more scalable and have the ability to fit into multiple hydrological niches, because of field tunability of system, including its hydraulic elevation and flow rate properties.

Case Example

The Fukushima Nuclear Power Plant is owned by the Tokyo Electric Power Company (TEPCO), in Japan. By 2011, it was one of 54 nuclear reactors in operation in Japan, which together were generating about 33% of the Japan's electricity needs. In 2011, the Fukushima Daiichi had a nuclear accident and was damaged, following an earthquake and a tsunami disaster that devastated the area where the Fukushima was located. Some consequences of the disaster for the country include, a) by 2020 only 9 out of the 54 reactors operating in 2011 were restarted, after all were shutdown, as a precaution, soon after the disaster; b) since 2011, Japan has switched to using more coal to get its electricity generated by thermo-power plants.

A serious consequence for TEPCO, the nuclear reactor operator, is that since 2011, it has been left with more than 270 million gallons of contaminated water, currently siting in thousands of tanks. The wastewater is from the water used to cool the nuclear core during their meltdown. The water has been chemically treated to remove most of the deleterious radioactive elements; however, it is still radioactive, especially with tritium. In 2019, the Minister of Environment announced that TEPCO has been given clearance to dump and discharge the radioactive wastewater into the Pacific Ocean. The reason given was that TEPCO was rapidly running out of space to store the contaminated, radioactive wastewater. After strong public opposition, especially from fishermen groups, and environmental groups, the government rescinded the decision. As far as it can be ascertained, as of now (2022 C.E.), the government has still not decided on the final disposition of the wastewater.

The system disclosed here expands the options available to the TEPCO and government, about the disposal of the contaminated wastewater, The existing choices are (a) the keep the wastewater in the storage tanks (the status quo) or (b) discharge it into the Pacific Ocean. The disclosed system provide additional options including (c) use the wastewater in the balls 300 to generate electricity with one or more power plants located on-land, near land or inshore (d) use submersibles that dive and store the balls 300 in storage containers located on the seafloor, either tethered to the continental shelf, or on the deep seabed, thus merely sequestering the balls, without bothering to use them to generate electricity (e) run the balls one time through a submersible deep water system, on their way to storage and sequestration and (f) construct one or more submersible power plants, and recycle the balls 300 using them to generate electricity indefinitely. The mother ship comes to perform the role of the upper storage reservoir, in the closed-loop scheme. The lower storage reservoir may be located as containers storing packetized wastewater on seabed or ocean floor.

Lunar Ballistic Gravity Electricity Power Generation

Electric power is needed on the Moon to support the grand ambitions of lunar exploration, lunar colonization, and for lunar staging as a waystation for Mars and other planetary exploration, all within the next two decades. In the coming years, the projected and anticipated uses of electricity on the Moon includes: (1) Moon landings and take-offs (2) lunar rover explorations and field research (3) lunar mining, mining extraction and exploitation for minerals and other materials (4) lunar colonies and habitats for non-human machines, robots and other mechanical, cybernetic automata (5) human habitats, colonies and outposts and (6) lunar staging points for outbound planetary and space explorations.

Figure 23:
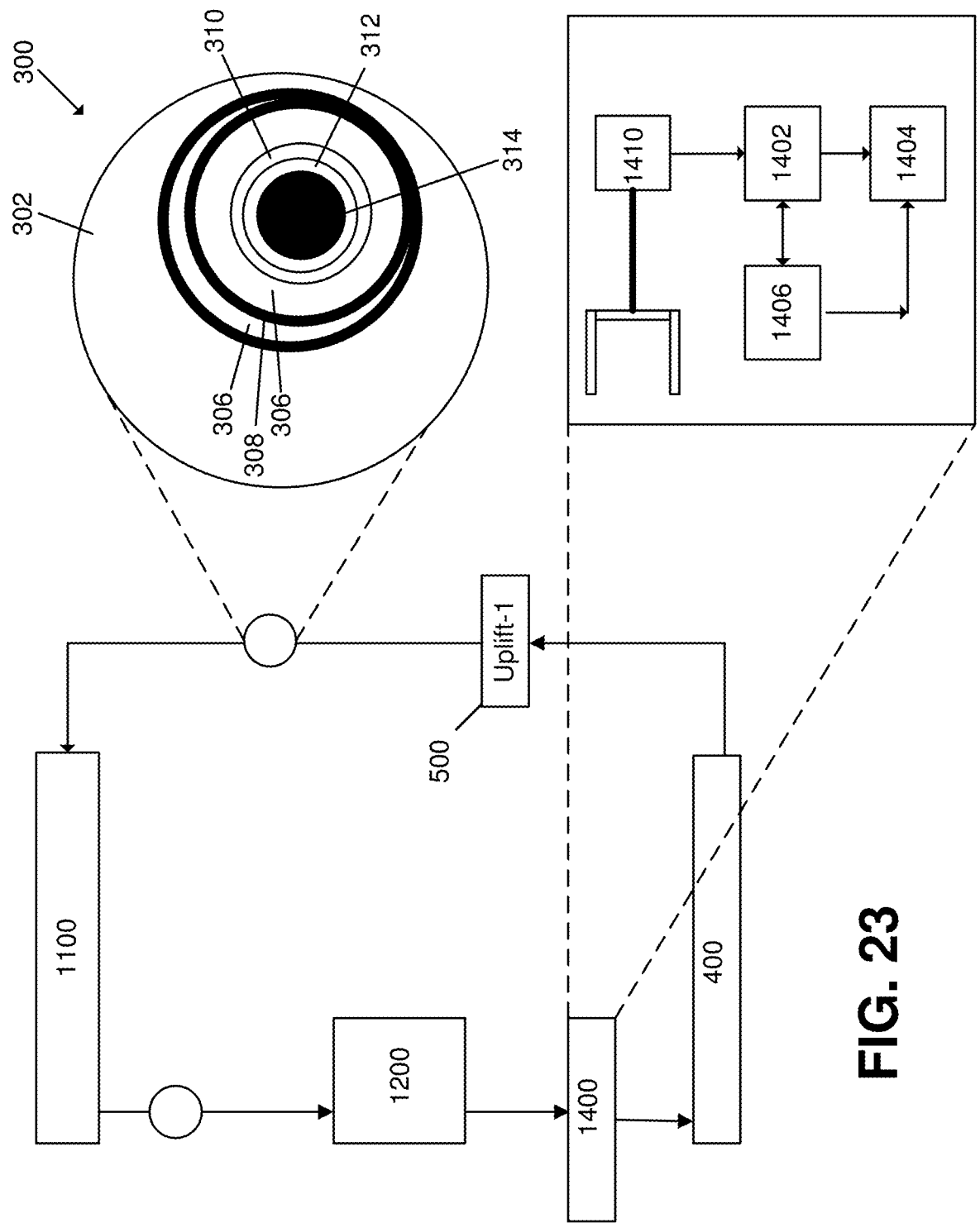
FIG. 23 illustrates one embodiment of an energy facility as a whole.
Figure 24:
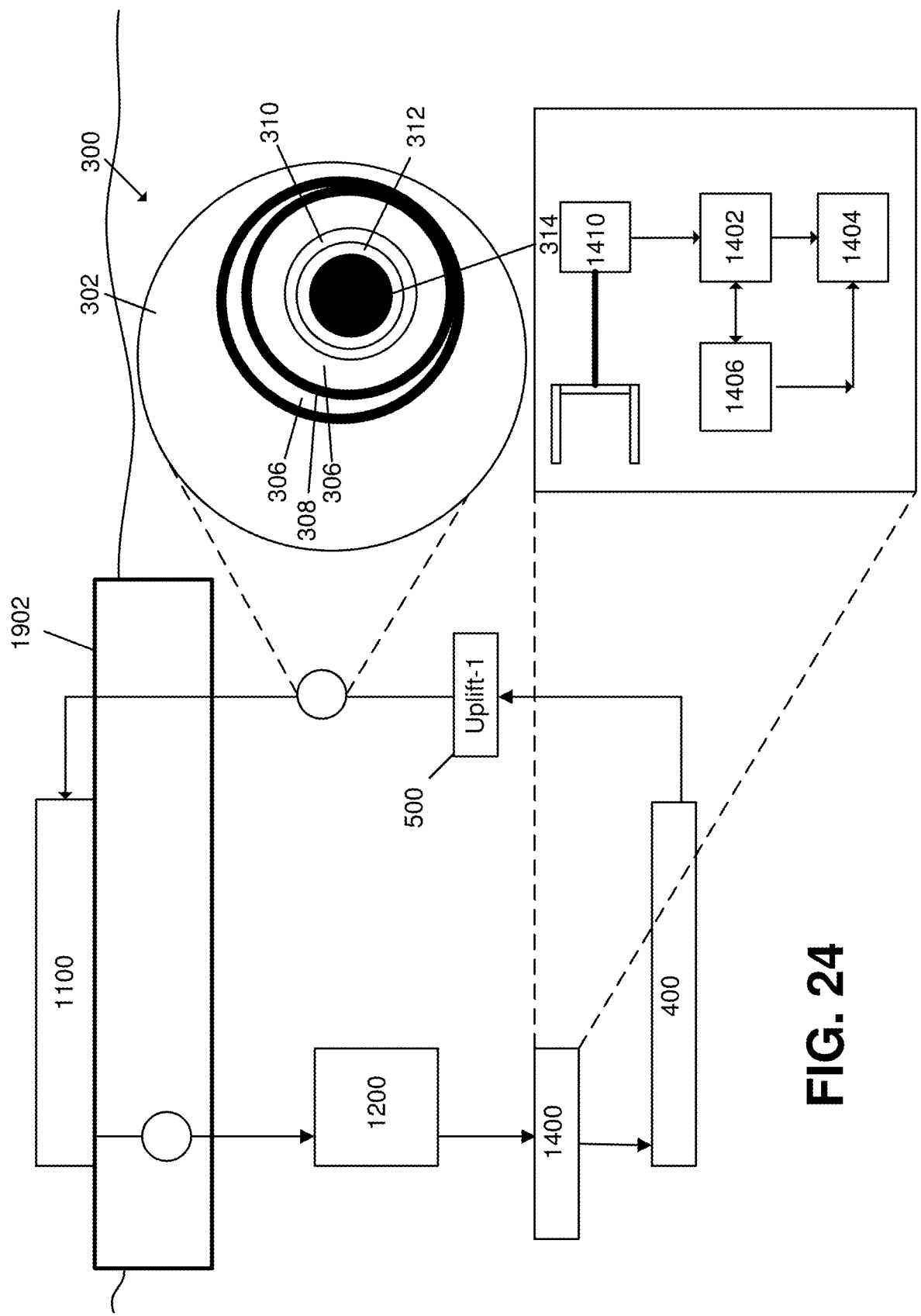
FIG. 24 depicts one embodiment of a system for generating electricity as a whole.

The lunar system is similar to the previously discussed systems (e.g. see FIG. 23) except in that (1) the system is located on a gravitational-body other than Earth (e.g. the Moon) (2) the payload 314 is regolith such as lunar regolith (3) the presence of a ball-preparation facility and (4) the omission of the uplift system 500.

Figure 25:
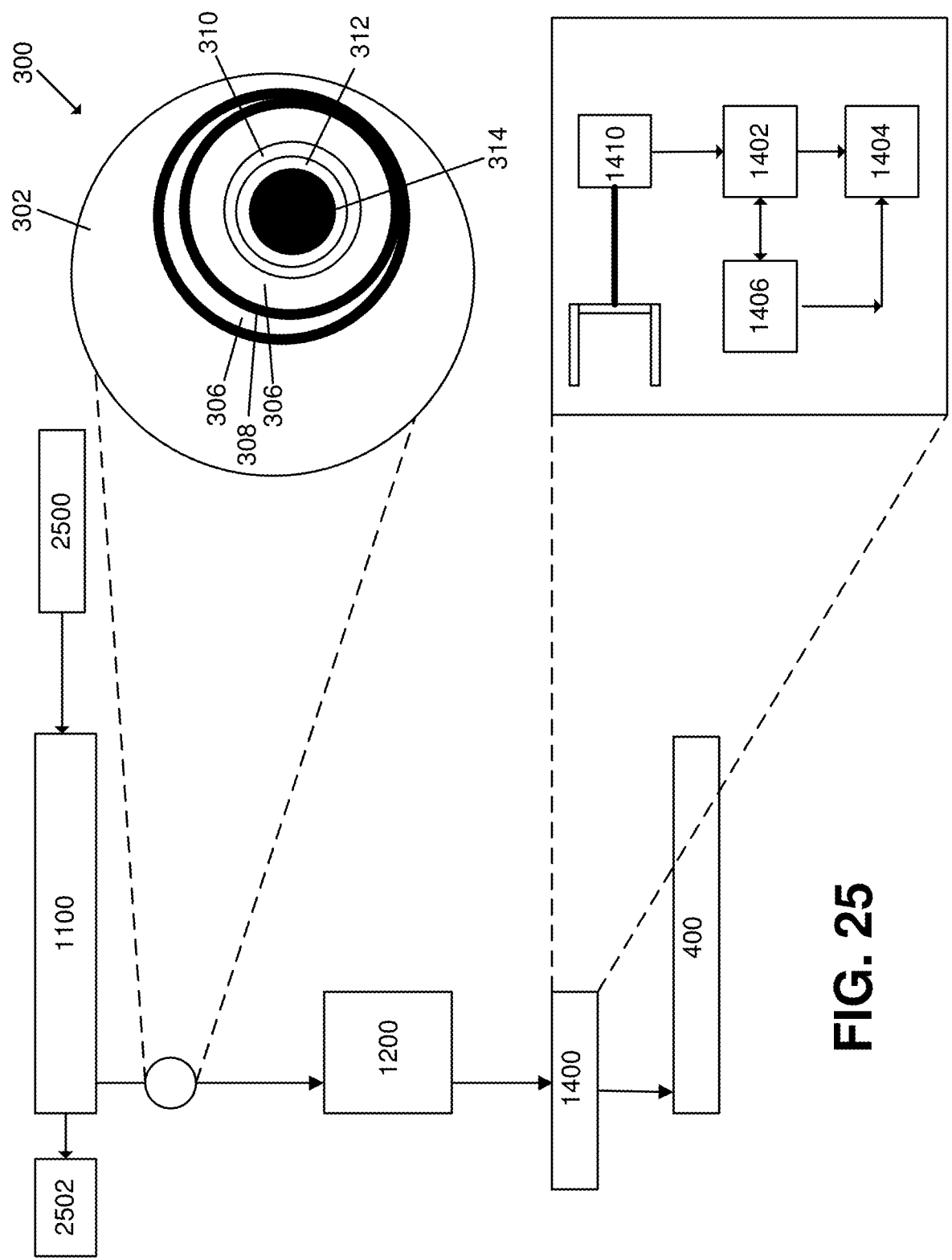
FIG. 25 depicts an embodiment of a system useful in non-Earth environments.

Referring to FIG. 25, the payload 314 of the ball 300 is lunar regolith. A ball-preparation facility 2500 collects lunar regolith and packages the regolith as payload 314. The ball-preparation facility 2500 collects lunar regolith with human guidance (e.g. manual or tele-operated robots) or robotic guidance (e.g. autonomous operation). The regolith may be collected in bags that are lined with dust binder-adhesives. The dust-binder adhesives may be formed from hydrocarbon-based resins (e.g. geopolymers, resins, photo-curable binders, glue-based resins) or bio-based resins (e.g. algae-based resins). The ball-reparation facility 2500 then packages the regolith as the payload 314, thereby preparing the ball 300. In the embodiment of FIG. 25, the ball-reparation facility 2500 is located at the same elevation (e.g. +3 meters) as the upper storage reservoir 1100.

The upper storage reservoir 1100 may be located at the top of a support 1202 such as an elevated lunar landform (e.g. rille, escarpment, rima, rift valley, cliff, lip of a mare, maria, crater, ocean, lake, basin, depression, plateau, rift valley, volcano, bay or channel).

The lunar system of FIG. 25 includes both the first energy storage system 1406 (disposed at the same elevation (e.g. +3 meters) as the turbine 1410 and a second energy storage system 2502 disposed at the same elevation (e.g. +3 meters) as the ball-preparation facility 2500. In one embodiment, there is an electrical transmission cable between the two energy storage systems. In one embodiment, photovoltaic solar panels supplement the lunar system.

Electric power may be distributed to points that may be distant from the point of production. Such points may include lunar bases, habitats, colonies, settlements, outputs, landing pads and launching pads. In one embodiment, the electricity stored in the first energy storage system 1406 and/or the second energy storage system 2502 may be stored in removable battery packs. The removable battery packs may be transported from a first location to a second location (e.g. from the lunar system from a remote base). In one embodiment, instead of using transmission and distribution infrastructure based on power lines, the disclosed system implements an above-ground surface, poled aerial ropeway transport. The ropes are jacketed, multi-fractal, multiply stranded cords. For example, each cord is made up of threads, which are in turn made up of sub-threads and so on, repeatedly, up to a finite number of times. This makes the ropes resilient and fault tolerant to micro-meteoroids, solar wind and cosmic radiation. The cargo carried on the ropeway transport are electric batteries and whole equipment and packages in the other direction.

The ropes are strung between vertical beams which are constructed in a manner similar to utility poles. The vertical beams can be bamboo-based or multi-porous colloidal materials made from cement and concrete. The latter type of material is lightweight and resilient to particulate impacts because many particles will be allowed to flow through the material. Carbonated cement and carbonated concrete, as well as concrete aerogel and cement aerogel can also be used as pole construction material. In one embodiment, the ropes are sourced from Earth. In another embodiment, the transport poles are lunar-sourced using sintering processes (glass and ceramic) or mixing and using binders (colloidal lunar concrete and colloidal lunar cement) poles and foundation blocks.

In one embodiment, the lunar system of FIG. 25 further includes an uplift system such as first uplift system 500. This loop then forms a circular economy. In some cases cost effectiveness is increased by recycling the balls 300, rather than prepare new balls 300 by collecting additional regolith.

The disclosed lunar facility uses, in one embodiment, materials from at least three sources at different stages of its development. In the first stage, Earth-sourced materials are used. In the second stage, hybrid-sourced materials are used from both the Earth and the Moon. In the third stage, lunar-sourced materials are used. In one embodiment, select components of the lunar facility will space suits (jacketed), like human astronauts. However, the jacketed components do not need human life support system components.

In the first stage, Earth-sourced materials are used. Materials are shipped from Earth to the Moon and manipulated by tele-operated robots (Earth-side or Moon-side controlled), autonomous, self-operated robots, or a mixture thereof.

In the second stage, hybrid-sourced materials are used from both the Earth and the Moon. The hybrid-sourced materials are for use by machine-human teams, robots (autonomous and/or teleoperated by humans) and machines located lunar-side and/or Earth-side.

In the third stage, lunar-sourced materials are used. The lunar-sourced materials are for use with machine-human teams, robots (autonomous and/or teleoperated by humans) and machines located lunar-side and/or Earth-side. For example, biomaterial (e.g. algae, bamboo, etc.) may be grown in lunar greenhouses and utilized as a source of material).

In another embodiment, the lunar facility comprises at least three additional stage including (1) optimized lunar resource utilization (2) incorporation of lunar orbit and Earth orbit resources and (3) incorporation of near-Earth objects (NEO) and solar planetary objects (SPO) such as asteroids.

Currently, for lunar electric power generation, the existing technologies include (1) radioisotope nuclear thermoelectric generators (used in equipment and machines, spacecraft, such as landers, rovers and ascenders), (2) lunar surface photovoltaic solar panels, (3) lunar orbit and/or Earth orbit located photovoltaic solar panels (with microwave-based wireless power transmission to the lunar surface), (4) electric power from nuclear reactors located on the lunar surface and (5) other means, such as solar thermal electric power generation, and electric power from solar wind.

This disclosure provides a practical system for generating electric power on the lunar surface using ballistic gravity electricity power generation. The method can also be implemented for other planetary bodies, such furnishing electric power on Mars. The disclosed system suitably addresses the extreme operating conditions prevalent on the Moon including: (1) extreme swings in temperature (2) permanent shadows (3) slow lunar rotation leads to prolonged day-night cycle (4) unconsolidated aggregate surface ("regolith") (5) near-zero atmosphere (which increases the effects of cosmic radiation, solar winds and impacts from debris) (6) low gravity compared to that of Earth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An energy facility comprising:
a plurality of balls, each ball comprising (1) an outer layer with (2) at least two inner layers that are sequentially disposed and separated from one another by a divider (3) an endosome layer within the at least two inner layers, (4) a payload container disposed within the at least two inner layers and (5) a payload disposed within the payload container, wherein the payload is selected from a group consisting of a solid and a liquid;
a plurality of conduits fluidly connecting (1) an upper storage reservoir to a drop-down system (2) the drop-down system to a power generation system and (3) the power generation system to a lower storage reservoir; wherein:
the lower storage reservoir is disposed at a first elevation;
the upper storage reservoir is disposed at a second elevation that is greater than the first elevation;
the power generation system comprising a generator and a turbine that rotates upon impact by the plurality of balls to generate electricity, the power generation system being proximate the first elevation.

2. The facility as recited in claim 1, wherein the drop-down system comprises at least one inclined conduit.

3. The facility as recited in claim 1, wherein each ball in the plurality of balls has a diameter between 0.1 mm and 1.5 m.

4. The facility as recited in claim 1, wherein the outer layer comprises a polymer.

5. The facility as recited in claim 1, wherein the at least two inner layers comprise elastomers.

6. The facility as recited in claim 1, wherein the dividers comprise a composite material.

7. The facility as recited in claim 1, wherein the dividers comprise a metal.

8. The facility as recited in claim 1, wherein the endosome layer comprises a rubber.

9. The facility as recited in claim 1, wherein the payload comprises water.

10. The facility as recited in claim 1, wherein the payload comprises lunar regolith.

11. The facility as recited in claim 1, further comprising a plurality of secondary balls with a diameter between 0.03 inches and 0.5 inches mixed with the plurality of balls.

12. The facility as recited in claim 1, wherein the upper storage reservoir is spaced from the power generation system by an elevation of between 100 feet and 1,000 feet.

13. The facility as recited in claim 1, wherein the upper storage reservoir is spaced from the power generation system by an elevation of between 500 feet and 1,000 feet.

14. The facility as recited in claim 1, wherein the drop-down system further comprises at least one runway section with rollers embedded in an exposed surface of the runway section, the rollers comprising hub motor-generators that generate electricity upon being rotated by contact with the plurality of balls.

15. The facility as recited in claim 14, wherein the drop-down system further comprises at least one wheeled cart wherein the at least one wheel comprises hub motor-generators that generate electricity upon being rotated.

16. The facility as recited in claim 1, wherein the drop-down system further comprises at least one wheeled cart wherein the at least one wheel comprises hub motor-generators that generate electricity upon being rotated.

17. The facility as recited in claim 1, further comprising an uplift system configured to uplift the plurality of balls from the lower storage reservoir to the upper storage reservoir.

18. The facility as recited in claim 1, further comprising a first energy storage system configured to store electricity generated by the power generation system, the first energy storage system being disposed proximate the turbine.

19. The facility as recited in claim 18, further comprising a second first energy storage system configured to store electricity generated by the power generation system, the second energy storage system being disposed proximate the upper storage reservoir.

* * * * *